US012057130B2

(12) United States Patent
Zhang

(10) Patent No.: US 12,057,130 B2
(45) Date of Patent: Aug. 6, 2024

(54) AUDIO SIGNAL ENCODING METHOD AND APPARATUS, AND AUDIO SIGNAL DECODING METHOD AND APPARATUS

(71) Applicant: HUAWEI TECHNOLOGIES CO., LTD., Guangdong (CN)

(72) Inventor: Dejun Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/852,479

(22) Filed: Jun. 29, 2022

(65) Prior Publication Data

US 2022/0335960 A1 Oct. 20, 2022

Related U.S. Application Data

(63) Continuation of application No. PCT/CN2020/141243, filed on Dec. 30, 2020.

(30) Foreign Application Priority Data

Dec. 31, 2019 (CN) ......................... 201911418553.8

(51) Int. Cl.
*G10L 19/02* (2013.01)
*G10L 19/008* (2013.01)
(Continued)

(52) U.S. Cl.
CPC ............ *G10L 19/02* (2013.01); *G10L 19/008* (2013.01); *G10L 19/09* (2013.01); *G10L 19/20* (2013.01); *G10L 19/265* (2013.01)

(58) Field of Classification Search
CPC ....... G10L 19/02; G10L 19/008; G10L 19/09; G10L 19/20; G10L 19/265; G10L 19/03;
(Continued)

(56) References Cited

U.S. PATENT DOCUMENTS 8,468,025 B2 * 6/2013 Liu ..................... G10L 21/0208
704/502
2007/0081593 A1 4/2007 Jeong et al.
(Continued)

FOREIGN PATENT DOCUMENTS

CN 1458646 A 11/2003
CN 101169934 A 4/2008
(Continued)

OTHER PUBLICATIONS

Jean-Marc Valin et al, A High-Quality Speech and Audio Codec With Less Than 10 ms Delay, Feb. 2016, 10 pages.
(Continued)

*Primary Examiner* — Pierre Louis Desir
*Assistant Examiner* — Keisha Y. Castillo-Torres

(57) ABSTRACT

An audio signal encoding method and apparatus, and an audio signal decoding method and apparatus are disclosed. The audio signal encoding method includes: obtaining a frequency-domain coefficient of a current frame and a frequency-domain coefficient of a reference signal of the current frame; performing filtering processing on the frequency-domain coefficient of the current frame to obtain a filtering parameter; determining a target frequency-domain coefficient of the current frame based on the filtering parameter; performing filtering processing on the frequency-domain coefficient of the reference signal and a reference frequency-domain coefficient based on the filtering parameter to obtain a target frequency-domain coefficient of the reference signal; and encoding the target frequency-domain coefficient of the current frame based on the target frequency-domain coefficient of the current frame, the target frequency-domain coefficient of the reference signal, and a reference target frequency-domain coefficient. The method can improve audio signal encoding/decoding efficiency.

11 Claims, 12 Drawing Sheets

(51) Int. Cl.

| | |
|---|---|
| ***G10L 19/09*** | (2013.01) |
| ***G10L 19/20*** | (2013.01) |
| ***G10L 19/26*** | (2013.01) |

(58) Field of Classification Search

CPC ....... G10L 19/032; G10L 19/13; G10L 19/16; G10L 19/26

See application file for complete search history.

(56) References Cited

U.S. PATENT DOCUMENTS

| | | | | |
|---|---|---|---|---|
| 2012/0323582 | A1 | 12/2012 | Peng et al. | |
| 2015/0010155 | A1* | 1/2015 | Virette | G10L 19/008 381/23 |
| 2016/0232909 | A1 | 8/2016 | Fuchs et al. | |
| 2016/0240203 | A1* | 8/2016 | Lecomte | G10L 19/038 |
| 2017/0047078 | A1* | 2/2017 | Wang | G10L 19/22 |
| 2022/0059099 | A1* | 2/2022 | Norvell | G10L 19/008 |

FOREIGN PATENT DOCUMENTS

| | | | |
|---|---|---|---|
| CN | 101527139 | A | 9/2009 |
| CN | 101770775 | A | 7/2010 |
| CN | 102098057 | A | 6/2011 |
| CN | 101925950 | B | 10/2013 |
| CN | 104681034 | A | 6/2015 |
| CN | 104718572 | A | 6/2015 |
| CN | 105408956 | A | 3/2016 |
| CN | 108231083 | A | 6/2018 |
| CN | 109427338 | A | 3/2019 |
| CN | 109545236 | A | 3/2019 |
| CN | 110556116 | A | 12/2019 |
| CN | 111670472 | A | 9/2020 |
| EP | 0684705 | A2 | 11/1995 |
| EP | 4075429 | A1 | 10/2022 |
| WO | 2008007873 | A1 | 1/2008 |
| WO | 2009086919 | A1 | 7/2009 |
| WO | 2021136344 | A1 | 7/2021 |

OTHER PUBLICATIONS

Christian R. Helmrich, et al., Frequency-Domain Prediction for Audio Coding, 2016, 5 pages.

International Search Report and Written Opinion issued in PCT/CN2020/141243, dated Mar. 29, 2021, 14 pages.

Extended European Search Report issued in EP20908793.1, dated Nov. 25, 2022, 10 pages.

Office Action issued in CN201911418553.8, dated Nov. 6, 2023, 8 pages.

* cited by examiner

AUDIO SIGNAL ENCODING METHOD AND APPARATUS, AND AUDIO SIGNAL DECODING METHOD AND APPARATUS

CROSS-REFERENCE TO RELATED APPLICATIONS

This application is a continuation of International Application No. PCT/CN2020/141243, filed on Dec. 30, 2020, which claims priority to Chinese Patent Application No. 201911418553.8, filed on Dec. 31, 2019. The disclosures of the aforementioned applications are hereby incorporated by reference in their entireties.

TECHNICAL FIELD

This application relates to the field of audio signal encoding/decoding technologies, and more specifically, to an audio signal encoding method and apparatus, and an audio signal decoding method and apparatus.

BACKGROUND

As quality of life improves, people have an increasing demand on high-quality audios. To better transmit an audio signal by using limited bandwidth, the audio signal is usually encoded first, and then a bitstream obtained through encoding processing is transmitted to a decoder side. The decoder side performs decoding processing on the received bitstream to obtain a decoded audio signal, where the decoded audio signal is used for playback.

There are many audio signal coding technologies. A frequency-domain encoding/decoding technology is a common audio encoding/decoding technology. In the frequency-domain encoding/decoding technology, compression encoding/decoding is performed by using short-term correlation and long-term correlation of an audio signal.

Therefore, how to improve encoding/decoding efficiency of performing frequency-domain encoding/decoding on an audio signal becomes an urgent technical problem to be resolved.

SUMMARY

This application provides an audio signal encoding method and apparatus, and an audio signal decoding method and apparatus, to improve audio signal encoding/decoding efficiency.

According to a first aspect, an audio signal encoding method is provided. The method includes: obtaining a frequency-domain coefficient of a current frame and a reference frequency-domain coefficient of the current frame; performing filtering processing on the frequency-domain coefficient of the current frame to obtain a filtering parameter; determining a target frequency-domain coefficient of the current frame based on the filtering parameter; performing the filtering processing on the reference frequency-domain coefficient based on the filtering parameter to obtain the reference target frequency-domain coefficient; and encoding the target frequency-domain coefficient of the current frame based on the reference target frequency-domain coefficient.

In this embodiment, filtering processing is performed on the frequency-domain coefficient of the current frame to obtain the filtering parameter, and filtering processing is performed on the frequency-domain coefficient of the current frame and the reference frequency-domain coefficient based on the filtering parameter, so that bits written into a bitstream can be reduced, and compression efficiency in encoding/decoding can be improved. Therefore, audio signal encoding/decoding efficiency can be improved.

The filtering parameter may be used to perform filtering processing on the frequency-domain coefficient of the current frame. The filtering processing may include temporary noise shaping (TNS) processing and/or frequency-domain noise shaping (FDNS) processing, or the filtering processing may include other processing. This is not limited in this embodiment of this application.

With reference to the first aspect, in some implementations of the first aspect, the filtering parameter is used to perform filtering processing on the frequency-domain coefficient of the current frame, and the filtering processing includes temporary noise shaping processing and/or frequency-domain noise shaping processing.

With reference to the first aspect, in some implementations of the first aspect, the encoding the target frequency-domain coefficient of the current frame based on the reference target frequency-domain coefficient includes: performing long-term prediction (LTP) determining based on the target frequency-domain coefficient and the reference target frequency-domain coefficient of the current frame, to obtain a value of an LTP identifier of the current frame, where the LTP identifier is used to indicate whether to perform LTP processing on the current frame; encoding the target frequency-domain coefficient of the current frame based on the value of the LTP identifier of the current frame; and writing the value of the LTP identifier of the current frame into a bitstream.

In this embodiment, the target frequency-domain coefficient of the current frame is encoded based on the LTP identifier of the current frame. In this way, redundant information in a signal can be reduced by using long-term correlation of the signal, so that compression efficiency in encoding/decoding can be improved. Therefore, audio signal encoding/decoding efficiency can be improved.

With reference to the first aspect, in some implementations of the first aspect, the encoding the target frequency-domain coefficient of the current frame based on the value of the LTP identifier of the current frame includes: when the LTP identifier of the current frame is a first value, performing LTP processing on the target frequency-domain coefficient and the reference target frequency-domain coefficient of the current frame to obtain a residual frequency-domain coefficient of the current frame; and encoding the residual frequency-domain coefficient of the current frame; or when the LTP identifier of the current frame is a second value, encoding the target frequency-domain coefficient of the current frame.

In this embodiment, when the LTP identifier of the current frame is the first value, LTP processing is performed on the target frequency-domain coefficient of the current frame. In this way, redundant information in a signal can be reduced by using long-term correlation of the signal, so that compression efficiency in encoding/decoding can be improved. Therefore, audio signal encoding/decoding efficiency can be improved.

With reference to the first aspect, in some implementations of the first aspect, the current frame includes a first channel and a second channel, and the LTP identifier of the current frame is used to indicate whether to perform LTP processing on both the first channel and the second channel of the current frame; or the LTP identifier of the current frame includes an LTP identifier of a first channel and an LTP identifier of a second channel, where the LTP identifier of the first channel is used to indicate whether to perform LTP processing on the first channel, and the LTP identifier of the second channel is used to indicate whether to perform LTP processing on the second channel.

The first channel may be a left channel of the current frame, and the second channel may be a right channel of the current frame; or the first channel may be an M channel of a mid/side stereo signal, and the second channel may be an S channel of a mid/side stereo signal.

With reference to the first aspect, in some implementations of the first aspect, when the LTP identifier of the current frame is the first value, the encoding the target frequency-domain coefficient of the current frame based on the LTP identifier of the current frame includes: performing stereo determining on a target frequency-domain coefficient of the first channel and a target frequency-domain coefficient of the second channel to obtain a stereo coding identifier of the current frame, where the stereo coding identifier is used to indicate whether to perform stereo encoding on the current frame; performing LTP processing on the target frequency-domain coefficient of the first channel, the target frequency-domain coefficient of the second channel, and the reference target frequency-domain coefficient based on the stereo coding identifier of the current frame, to obtain a residual frequency-domain coefficient of the first channel and a residual frequency-domain coefficient of the second channel; and encoding the residual frequency-domain coefficient of the first channel and the residual frequency-domain coefficient of the second channel.

In this embodiment, LTP processing is performed on the current frame after stereo determining is performed on the current frame, so that a stereo determining result is not affected by LTP processing. This helps improve stereo determining accuracy, and further helps improve compression efficiency in encoding/decoding.

With reference to the first aspect, in some implementations of the first aspect, the performing LTP processing on the target frequency-domain coefficient of the first channel, the target frequency-domain coefficient of the second channel, and the reference target frequency-domain coefficient based on the stereo coding identifier of the current frame, to obtain a residual frequency-domain coefficient of the first channel and a residual frequency-domain coefficient of the second channel includes: when the stereo coding identifier is a first value, performing stereo encoding on the reference target frequency-domain coefficient to obtain an encoded reference target frequency-domain coefficient; and performing LTP processing on the target frequency-domain coefficient of the first channel, the target frequency-domain coefficient of the second channel, and the encoded reference target frequency-domain coefficient to obtain the residual frequency-domain coefficient of the first channel and the residual frequency-domain coefficient of the second channel; or when the stereo coding identifier is a second value, performing LTP processing on the target frequency-domain coefficient of the first channel, the target frequency-domain coefficient of the second channel, and the reference target frequency-domain coefficient to obtain the residual frequency-domain coefficient of the first channel and the residual frequency-domain coefficient of the second channel.

With reference to the first aspect, in some implementations of the first aspect, when the LTP identifier of the current frame is the first value, the encoding the target frequency-domain coefficient of the current frame based on the LTP identifier of the current frame includes: performing LTP processing on a target frequency-domain coefficient of the first channel and a target frequency-domain coefficient of the second channel based on the LTP identifier of the current frame to obtain a residual frequency-domain coefficient of the first channel and a residual frequency-domain coefficient of the second channel; performing stereo determining on the residual frequency-domain coefficient of the first channel and the residual frequency-domain coefficient of the second channel to obtain a stereo coding identifier of the current frame, where the stereo coding identifier is used to indicate whether to perform stereo encoding on the current frame; and encoding the residual frequency-domain coefficient of the first channel and the residual frequency-domain coefficient of the second channel based on the stereo coding identifier of the current frame.

With reference to the first aspect, in some implementations of the first aspect, the encoding the residual frequency-domain coefficient of the first channel and the residual frequency-domain coefficient of the second channel based on the stereo coding identifier of the current frame includes: when the stereo coding identifier is a first value, performing stereo encoding on the reference target frequency-domain coefficient to obtain an encoded reference target frequency-domain coefficient; performing update processing on the residual frequency-domain coefficient of the first channel and the residual frequency-domain coefficient of the second channel based on the encoded reference target frequency-domain coefficient to obtain an updated residual frequency-domain coefficient of the first channel and an updated residual frequency-domain coefficient of the second channel; and encoding the updated residual frequency-domain coefficient of the first channel and the updated residual frequency-domain coefficient of the second channel; or when the stereo coding identifier is a second value, encoding the residual frequency-domain coefficient of the first channel and the residual frequency-domain coefficient of the second channel.

With reference to the first aspect, in some implementations of the first aspect, the method further includes: when the LTP identifier of the current frame is the second value, calculating an intensity level difference (ILD) between the first channel and the second channel; and adjusting energy of the first channel or energy of the second channel signal based on the ILD.

In this embodiment, when LTP processing is performed on the current frame (that is, the LTP identifier of the current frame is the first value), the intensity level difference (ILD) between the first channel and the second channel is not calculated, and the energy of the first channel or the energy of the second channel signal is not adjusted based on the ILD, either. This can ensure time (time domain) continuity of a signal, so that LTP processing performance can be improved. Therefore, audio signal encoding/decoding efficiency can be improved.

According to a second aspect, an audio signal decoding method is provided. The method includes: parsing a bitstream to obtain a decoded frequency-domain coefficient of a current frame, a filtering parameter, and an LTP identifier of the current frame, where the LTP identifier is used to indicate whether to perform long-term prediction (LTP) processing on the current frame; and processing the decoded frequency-domain coefficient of the current frame based on the filtering parameter and the LTP identifier of the current frame to obtain a frequency-domain coefficient of the current frame.

In this embodiment, LTP processing is performed on the target frequency-domain coefficient of the current frame. In this way, redundant information in a signal can be reduced by using long-term correlation of the signal, so that compression efficiency in encoding/decoding can be improved. Therefore, audio signal encoding/decoding efficiency can be improved.

The filtering parameter may be used to perform filtering processing on the frequency-domain coefficient of the current frame. The filtering processing may include temporary noise shaping (TNS) processing and/or frequency-domain noise shaping (FDNS) processing, or the filtering processing may include other processing. This is not limited in this embodiment of this application.

Optionally, the decoded frequency-domain coefficient of the current frame may be a residual frequency-domain coefficient of the current frame, or the decoded frequency-domain coefficient of the current frame is a target frequency-domain coefficient of the current frame.

With reference to the second aspect, in some implementations of the second aspect, the filtering parameter is used to perform filtering processing on the frequency-domain coefficient of the current frame, and the filtering processing includes temporary noise shaping processing and/or frequency-domain noise shaping processing.

With reference to the second aspect, in some implementations of the second aspect, the current frame includes a first channel and a second channel, and the LTP identifier of the current frame is used to indicate whether to perform LTP processing on both the first channel and the second channel of the current frame; or the LTP identifier of the current frame includes an LTP identifier of a first channel and an LTP identifier of a second channel, where the LTP identifier of the first channel is used to indicate whether to perform LTP processing on the first channel, and the LTP identifier of the second channel is used to indicate whether to perform LTP processing on the second channel.

The first channel may be a left channel of the current frame, and the second channel may be a right channel of the current frame; or the first channel may be an M channel of a mid/side stereo signal, and the second channel may be an S channel of a mid/side stereo signal.

With reference to the second aspect, in some implementations of the second aspect, when the LTP identifier of the current frame is a first value, the decoded frequency-domain coefficient of the current frame is a residual frequency-domain coefficient of the current frame; and the processing the target frequency-domain coefficient of the current frame based on the filtering parameter and the LTP identifier of the current frame to obtain a frequency-domain coefficient of the current frame includes: when the LTP identifier of the current frame is the first value, obtaining a reference target frequency-domain coefficient of the current frame; performing LTP synthesis on the reference target frequency-domain coefficient and the residual frequency-domain coefficient of the current frame to obtain a target frequency-domain coefficient of the current frame; and performing inverse filtering processing on the target frequency-domain coefficient of the current frame to obtain the frequency-domain coefficient of the current frame.

With reference to the second aspect, in some implementations of the second aspect, the obtaining a reference target frequency-domain coefficient of the current frame includes: parsing the bitstream to obtain a pitch period of the current frame; determining a reference frequency-domain coefficient of the current frame based on the pitch period of the current frame; and performing filtering processing on the reference frequency-domain coefficient based on the filtering parameter to obtain the reference target frequency-domain coefficient.

In this embodiment, filtering processing is performed on the reference frequency-domain coefficient based on the filtering parameter, so that bits written into a bitstream can be reduced, and compression efficiency in encoding/decoding can be improved. Therefore, audio signal encoding/decoding efficiency can be improved.

With reference to the second aspect, in some implementations of the second aspect, when the LTP identifier of the current frame is a second value, the decoded frequency-domain coefficient of the current frame is a target frequency-domain coefficient of the current frame; and the processing the decoded frequency-domain coefficient of the current frame based on the filtering parameter and the LTP identifier of the current frame to obtain a frequency-domain coefficient of the current frame includes: when the LTP identifier of the current frame is the second value, performing inverse filtering processing on the target frequency-domain coefficient of the current frame to obtain the frequency-domain coefficient of the current frame.

With reference to the second aspect, in some implementations of the second aspect, the inverse filtering processing includes inverse temporary noise shaping processing and/or inverse frequency-domain noise shaping processing.

With reference to the second aspect, in some implementations of the second aspect, the performing LTP synthesis on the reference target frequency-domain coefficient and the residual frequency-domain coefficient of the current frame to obtain a target frequency-domain coefficient of the current frame includes: parsing the bitstream to obtain a stereo coding identifier of the current frame, where the stereo coding identifier is used to indicate whether to perform stereo coding on the current frame; performing LTP synthesis on the residual frequency-domain coefficient of the current frame and the reference target frequency-domain coefficient based on the stereo coding identifier to obtain an LTP-synthesized target frequency-domain coefficient of the current frame; and performing stereo decoding on the LTP-synthesized target frequency-domain coefficient of the current frame based on the stereo coding identifier to obtain the target frequency-domain coefficient of the current frame.

With reference to the second aspect, in some implementations of the second aspect, the performing LTP synthesis on the residual frequency-domain coefficient of the current frame and the reference target frequency-domain coefficient based on the stereo coding identifier to obtain an LTP-synthesized target frequency-domain coefficient of the current frame includes: when the stereo coding identifier is a first value, performing stereo decoding on the reference target frequency-domain coefficient to obtain a decoded reference target frequency-domain coefficient, where the first value is used to indicate to perform stereo coding on the current frame; and performing LTP synthesis on a residual frequency-domain coefficient of the first channel, a residual frequency-domain coefficient of the second channel, and the decoded reference target frequency-domain coefficient to obtain an LTP-synthesized target frequency-domain coefficient of the first channel and an LTP-synthesized target frequency-domain coefficient of the second channel; or when the stereo coding identifier is a second value, performing LTP processing on a residual frequency-domain coefficient of the first channel, a residual frequency-domain coefficient of the second channel, and the reference target frequency-domain coefficient to obtain an LTP-synthesized target frequency-domain coefficient of the first channel and an LTP-synthesized target frequency-domain coefficient of the second channel, where the second value is used to indicate not to perform stereo coding on the current frame.

With reference to the second aspect, in some implementations of the second aspect, the performing LTP synthesis on the reference target frequency-domain coefficient and the residual frequency-domain coefficient of the current frame to obtain a target frequency-domain coefficient of the current frame includes: parsing the bitstream to obtain a stereo coding identifier of the current frame, where the stereo coding identifier is used to indicate whether to perform stereo coding on the current frame; performing stereo decoding on the residual frequency-domain coefficient of the current frame based on the stereo coding identifier to obtain a decoded residual frequency-domain coefficient of the current frame; and performing LTP synthesis on the decoded residual frequency-domain coefficient of the current frame based on the LTP identifier of the current frame and the stereo coding identifier to obtain the target frequency-domain coefficient of the current frame.

With reference to the second aspect, in some implementations of the second aspect, the performing LTP synthesis on the decoded residual frequency-domain coefficient of the current frame based on the LTP identifier of the current frame and the stereo coding identifier to obtain the target frequency-domain coefficient of the current frame includes: when the stereo coding identifier is a first value, performing stereo decoding on the reference target frequency-domain coefficient to obtain a decoded reference target frequency-domain coefficient, where the first value is used to indicate to perform stereo coding on the current frame; and performing LTP synthesis on a decoded residual frequency-domain coefficient of the first channel, a decoded residual frequency-domain coefficient of the second channel, and the decoded reference target frequency-domain coefficient to obtain a target frequency-domain coefficient of the first channel and a target frequency-domain coefficient of the second channel; or when the stereo coding identifier is a second value, performing LTP synthesis on a decoded residual frequency-domain coefficient of the first channel, a decoded residual frequency-domain coefficient of the second channel, and the reference target frequency-domain coefficient to obtain a target frequency-domain coefficient of the first channel and a target frequency-domain coefficient of the second channel, where the second value is used to indicate not to perform stereo coding on the current frame.

With reference to the second aspect, in some implementations of the second aspect, the method further includes: when the LTP identifier of the current frame is the second value, parsing the bitstream to obtain an intensity level difference (ILD) between the first channel and the second channel; and adjusting energy of the first channel or energy of the second channel based on the ILD.

In this embodiment, when LTP processing is performed on the current frame (that is, the LTP identifier of the current frame is the first value), the intensity level difference (ILD) between the first channel and the second channel is not calculated, and the energy of the first channel or the energy of the second channel signal is not adjusted based on the ILD, either. This can ensure time (time domain) continuity of a signal, so that LTP processing performance can be improved. Therefore, audio signal encoding/decoding efficiency can be improved.

According to a third aspect, an audio signal encoding apparatus is provided, including: an obtaining module, configured to obtain a frequency-domain coefficient of a current frame and a reference frequency-domain coefficient of the current frame; a filtering module, configured to perform filtering processing on the frequency-domain coefficient of the current frame to obtain a filtering parameter, where the filtering module is further configured to determine a target frequency-domain coefficient of the current frame based on the filtering parameter; and the filtering module is further configured to perform the filtering processing on the reference frequency-domain coefficient based on the filtering parameter to obtain the reference target frequency-domain coefficient; and an encoding module, configured to encode the target frequency-domain coefficient of the current frame based on the reference target frequency-domain coefficient.

In this embodiment, filtering processing is performed on the frequency-domain coefficient of the current frame to obtain the filtering parameter, and filtering processing is performed on the frequency-domain coefficient of the current frame and the reference frequency-domain coefficient based on the filtering parameter, so that bits written into a bitstream can be reduced, and compression efficiency in encoding/decoding can be improved. Therefore, audio signal encoding/decoding efficiency can be improved.

The filtering parameter may be used to perform filtering processing on the frequency-domain coefficient of the current frame. The filtering processing may include temporary noise shaping (TNS) processing and/or frequency-domain noise shaping (FDNS) processing, or the filtering processing may include other processing. This is not limited in this embodiment of this application.

With reference to the third aspect, in some implementations of the third aspect, the filtering parameter is used to perform filtering processing on the frequency-domain coefficient of the current frame, and the filtering processing includes temporary noise shaping processing and/or frequency-domain noise shaping processing.

With reference to the third aspect, in some implementations of the third aspect, the encoding module is specifically configured to: perform long-term prediction (LTP) determining based on the target frequency-domain coefficient and the reference target frequency-domain coefficient of the current frame, to obtain a value of an LTP identifier of the current frame, where the LTP identifier is used to indicate whether to perform LTP processing on the current frame; encode the target frequency-domain coefficient of the current frame based on the value of the LTP identifier of the current frame; and write the value of the LTP identifier of the current frame into a bitstream.

In this embodiment, the target frequency-domain coefficient of the current frame is encoded based on the LTP identifier of the current frame. In this way, redundant information in a signal can be reduced by using long-term correlation of the signal, so that compression efficiency in encoding/decoding can be improved. Therefore, audio signal encoding/decoding efficiency can be improved.

With reference to the third aspect, in some implementations of the third aspect, the encoding module is specifically configured to: when the LTP identifier of the current frame is a first value, perform LTP processing on the target frequency-domain coefficient and the reference target frequency-domain coefficient of the current frame to obtain a residual frequency-domain coefficient of the current frame; and encode the residual frequency-domain coefficient of the current frame; or when the LTP identifier of the current frame is a second value, encode the target frequency-domain coefficient of the current frame.

In this embodiment, when the LTP identifier of the current frame is the first value, LTP processing is performed on the target frequency-domain coefficient of the current frame. In this way, redundant information in a signal can be reduced by using long-term correlation of the signal, so that compression efficiency in encoding/decoding can be improved. Therefore, audio signal encoding/decoding efficiency can be improved.

With reference to the third aspect, in some implementations of the third aspect, the current frame includes a first channel and a second channel, and the LTP identifier of the current frame is used to indicate whether to perform LTP processing on both the first channel and the second channel of the current frame; or the LTP identifier of the current frame includes an LTP identifier of a first channel and an LTP identifier of a second channel, where the LTP identifier of the first channel is used to indicate whether to perform LTP processing on the first channel, and the LTP identifier of the second channel is used to indicate whether to perform LTP processing on the second channel.

The first channel may be a left channel of the current frame, and the second channel may be a right channel of the current frame; or the first channel may be an M channel of a mid/side stereo signal, and the second channel may be an S channel of a mid/side stereo signal.

With reference to the third aspect, in some implementations of the third aspect, when the LTP identifier of the current frame is the first value, the encoding module is specifically configured to: perform stereo determining on a target frequency-domain coefficient of the first channel and a target frequency-domain coefficient of the second channel to obtain a stereo coding identifier of the current frame, where the stereo coding identifier is used to indicate whether to perform stereo encoding on the current frame; perform LTP processing on the target frequency-domain coefficient of the first channel, the target frequency-domain coefficient of the second channel, and the reference target frequency-domain coefficient based on the stereo coding identifier of the current frame, to obtain a residual frequency-domain coefficient of the first channel and a residual frequency-domain coefficient of the second channel; and encode the residual frequency-domain coefficient of the first channel and the residual frequency-domain coefficient of the second channel.

In this embodiment, LTP processing is performed on the current frame after stereo determining is performed on the current frame, so that a stereo determining result is not affected by LTP processing. This helps improve stereo determining accuracy, and further helps improve compression efficiency in encoding/decoding.

With reference to the third aspect, in some implementations of the third aspect, the encoding module is specifically configured to: when the stereo coding identifier is a first value, perform stereo encoding on the reference target frequency-domain coefficient to obtain an encoded reference target frequency-domain coefficient; and perform LTP processing on the target frequency-domain coefficient of the first channel, the target frequency-domain coefficient of the second channel, and the encoded reference target frequency-domain coefficient to obtain the residual frequency-domain coefficient of the first channel and the residual frequency-domain coefficient of the second channel; or when the stereo coding identifier is a second value, perform LTP processing on the target frequency-domain coefficient of the first channel, the target frequency-domain coefficient of the second channel, and the reference target frequency-domain coefficient to obtain the residual frequency-domain coefficient of the first channel and the residual frequency-domain coefficient of the second channel.

With reference to the third aspect, in some implementations of the third aspect, when the LTP identifier of the current frame is the first value, the encoding module is specifically configured to: perform LTP processing on a target frequency-domain coefficient of the first channel and a target frequency-domain coefficient of the second channel based on the LTP identifier of the current frame to obtain a residual frequency-domain coefficient of the first channel and a residual frequency-domain coefficient of the second channel; perform stereo determining on the residual frequency-domain coefficient of the first channel and the residual frequency-domain coefficient of the second channel to obtain a stereo coding identifier of the current frame, where the stereo coding identifier is used to indicate whether to perform stereo encoding on the current frame; and encode the residual frequency-domain coefficient of the first channel and the residual frequency-domain coefficient of the second channel based on the stereo coding identifier of the current frame.

With reference to the third aspect, in some implementations of the third aspect, the encoding module is specifically configured to: when the stereo coding identifier is a first value, perform stereo encoding on the reference target frequency-domain coefficient to obtain an encoded reference target frequency-domain coefficient; perform update processing on the residual frequency-domain coefficient of the first channel and the residual frequency-domain coefficient of the second channel based on the encoded reference target frequency-domain coefficient to obtain an updated residual frequency-domain coefficient of the first channel and an updated residual frequency-domain coefficient of the second channel; and encode the updated residual frequency-domain coefficient of the first channel and the updated residual frequency-domain coefficient of the second channel; or when the stereo coding identifier is a second value, encode the residual frequency-domain coefficient of the first channel and the residual frequency-domain coefficient of the second channel.

With reference to the third aspect, in some implementations of the third aspect, the encoding apparatus further includes an adjustment module. The adjustment module is configured to: when the LTP identifier of the current frame is the second value, calculate an intensity level difference (ILD) between the first channel and the second channel; and adjust energy of the first channel or energy of the second channel signal based on the ILD.

In this embodiment, when LTP processing is performed on the current frame (that is, the LTP identifier of the current frame is the first value), the intensity level difference (ILD) between the first channel and the second channel is not calculated, and the energy of the first channel or the energy of the second channel signal is not adjusted based on the ILD, either. This can ensure time (time domain) continuity of a signal, so that LTP processing performance can be improved.

According to a fourth aspect, an audio signal decoding apparatus is provided, including: a decoding module, configured to parse a bitstream to obtain a decoded frequency-domain coefficient of a current frame, a filtering parameter, and an LTP identifier of the current frame, where the LTP identifier is used to indicate whether to perform long-term prediction (LTP) processing on the current frame; and a processing module, configured to process the decoded frequency-domain coefficient of the current frame based on the filtering parameter and the LTP identifier of the current frame to obtain a frequency-domain coefficient of the current frame.

In this embodiment, LTP processing is performed on the target frequency-domain coefficient of the current frame. In this way, redundant information in a signal can be reduced by using long-term correlation of the signal, so that compression efficiency in encoding/decoding can be improved. Therefore, audio signal encoding/decoding efficiency can be improved.

The filtering parameter may be used to perform filtering processing on the frequency-domain coefficient of the current frame. The filtering processing may include temporary noise shaping (TNS) processing and/or frequency-domain noise shaping (FDNS) processing, or the filtering processing may include other processing. This is not limited in this embodiment of this application.

Optionally, the decoded frequency-domain coefficient of the current frame may be a residual frequency-domain coefficient of the current frame, or the decoded frequency-domain coefficient of the current frame is a target frequency-domain coefficient of the current frame.

With reference to the fourth aspect, in some implementations of the fourth aspect, the filtering parameter is used to perform filtering processing on the frequency-domain coefficient of the current frame, and the filtering processing includes temporary noise shaping processing and/or frequency-domain noise shaping processing.

With reference to the fourth aspect, in some implementations of the fourth aspect, the current frame includes a first channel and a second channel, and the LTP identifier of the current frame is used to indicate whether to perform LTP processing on both the first channel and the second channel of the current frame; or the LTP identifier of the current frame includes an LTP identifier of a first channel and an LTP identifier of a second channel, where the LTP identifier of the first channel is used to indicate whether to perform LTP processing on the first channel, and the LTP identifier of the second channel is used to indicate whether to perform LTP processing on the second channel.

The first channel may be a left channel of the current frame, and the second channel may be a right channel of the current frame; or the first channel may be an M channel of a mid/side stereo signal, and the second channel may be an S channel of a mid/side stereo signal.

With reference to the fourth aspect, in some implementations of the fourth aspect, when the LTP identifier of the current frame is a first value, the decoded frequency-domain coefficient of the current frame is a residual frequency-domain coefficient of the current frame. The processing module is specifically configured to: when the LTP identifier of the current frame is the first value, obtain a reference target frequency-domain coefficient of the current frame; perform LTP synthesis on the reference target frequency-domain coefficient and the residual frequency-domain coefficient of the current frame to obtain a target frequency-domain coefficient of the current frame; and perform inverse filtering processing on the target frequency-domain coefficient of the current frame to obtain the frequency-domain coefficient of the current frame.

With reference to the fourth aspect, in some implementations of the fourth aspect, the processing module is specifically configured to: parse the bitstream to obtain a pitch period of the current frame; determine a reference frequency-domain coefficient of the current frame based on the pitch period of the current frame; and perform filtering processing on the reference frequency-domain coefficient based on the filtering parameter to obtain the reference target frequency-domain coefficient.

In this embodiment, filtering processing is performed on the reference frequency-domain coefficient based on the filtering parameter, so that bits written into a bitstream can be reduced, and compression efficiency in encoding/decoding can be improved. Therefore, audio signal encoding/decoding efficiency can be improved.

With reference to the fourth aspect, in some implementations of the fourth aspect, when the LTP identifier of the current frame is a second value, the decoded frequency-domain coefficient of the current frame is a target frequency-domain coefficient of the current frame; and the processing module is specifically configured to: when the LTP identifier of the current frame is the second value, perform inverse filtering processing on the target frequency-domain coefficient of the current frame to obtain the frequency-domain coefficient of the current frame.

With reference to the fourth aspect, in some implementations of the fourth aspect, the inverse filtering processing includes inverse temporary noise shaping processing and/or inverse frequency-domain noise shaping processing.

With reference to the fourth aspect, in some implementations of the fourth aspect, the decoding module is further configured to parse the bitstream to obtain a stereo coding identifier of the current frame, where the stereo coding identifier is used to indicate whether to perform stereo coding on the current frame. The processing module is specifically configured to: perform LTP synthesis on the residual frequency-domain coefficient of the current frame and the reference target frequency-domain coefficient based on the stereo coding identifier to obtain an LTP-synthesized target frequency-domain coefficient of the current frame; and perform stereo decoding on the LTP-synthesized target frequency-domain coefficient of the current frame based on the stereo coding identifier to obtain the target frequency-domain coefficient of the current frame.

With reference to the fourth aspect, in some implementations of the fourth aspect, the processing module is specifically configured to: when the stereo coding identifier is a first value, perform stereo decoding on the reference target frequency-domain coefficient to obtain a decoded reference target frequency-domain coefficient, where the first value is used to indicate to perform stereo coding on the current frame; and perform LTP synthesis on a residual frequency-domain coefficient of the first channel, a residual frequency-domain coefficient of the second channel, and the decoded reference target frequency-domain coefficient to obtain an LTP-synthesized target frequency-domain coefficient of the first channel and an LTP-synthesized target frequency-domain coefficient of the second channel; or when the stereo coding identifier is a second value, perform LTP processing on a residual frequency-domain coefficient of the first channel, a residual frequency-domain coefficient of the second channel, and the reference target frequency-domain coefficient to obtain an LTP-synthesized target frequency-domain coefficient of the first channel and an LTP-synthesized target frequency-domain coefficient of the second channel, where the second value is used to indicate not to perform stereo coding on the current frame.

With reference to the fourth aspect, in some implementations of the fourth aspect, the decoding module is further configured to parse the bitstream to obtain a stereo coding identifier of the current frame, where the stereo coding identifier is used to indicate whether to perform stereo coding on the current frame. The processing module is specifically configured to: perform stereo decoding on the residual frequency-domain coefficient of the current frame based on the stereo coding identifier to obtain a decoded residual frequency-domain coefficient of the current frame; and perform LTP synthesis on the decoded residual frequency-domain coefficient of the current frame based on the LTP identifier of the current frame and the stereo coding identifier to obtain the target frequency-domain coefficient of the current frame.

With reference to the fourth aspect, in some implementations of the fourth aspect, the processing module is specifically configured to: when the stereo coding identifier is a first value, perform stereo decoding on the reference target frequency-domain coefficient to obtain a decoded reference target frequency-domain coefficient, where the first value is used to indicate to perform stereo coding on the current frame; and perform LTP synthesis on a decoded residual frequency-domain coefficient of the first channel, a decoded residual frequency-domain coefficient of the second channel, and the decoded reference target frequency-domain coefficient to obtain a target frequency-domain coefficient of the first channel and a target frequency-domain coefficient of the second channel; or when the stereo coding identifier is a second value, perform LTP synthesis on a decoded residual frequency-domain coefficient of the first channel, a decoded residual frequency-domain coefficient of the second channel, and the reference target frequency-domain coefficient to obtain a target frequency-domain coefficient of the first channel and a target frequency-domain coefficient of the second channel, where the second value is used to indicate not to perform stereo coding on the current frame.

With reference to the fourth aspect, in some implementations of the fourth aspect, the decoding apparatus further includes an adjustment module. The adjustment module is configured to: when the LTP identifier of the current frame is the second value, parse the bitstream to obtain an intensity level difference (ILD) between the first channel and the second channel; and adjust energy of the first channel or energy of the second channel based on the ILD.

In this embodiment, when LTP processing is performed on the current frame (that is, the LTP identifier of the current frame is the first value), the intensity level difference (ILD) between the first channel and the second channel is not calculated, and the energy of the first channel or the energy of the second channel signal is not adjusted based on the ILD, either. This can ensure time (time domain) continuity of a signal, so that LTP processing performance can be improved. Therefore, audio signal encoding/decoding efficiency can be improved.

According to a fifth aspect, an encoding apparatus is provided. The encoding apparatus includes a storage medium and a central processing unit. The storage medium may be a nonvolatile storage medium and stores a computer executable program, and the central processing unit is connected to the nonvolatile storage medium and executes the computer executable program to implement the method in the first aspect or the implementations of the first aspect.

According to a sixth aspect, an encoding apparatus is provided. The encoding apparatus includes a storage medium and a central processing unit. The storage medium may be a nonvolatile storage medium and stores a computer executable program, and the central processing unit is connected to the nonvolatile storage medium and executes the computer executable program to implement the method in the second aspect or the implementations of the second aspect.

According to a seventh aspect, a computer-readable storage medium is provided. The computer-readable medium stores program code to be executed by a device, where the program code includes instructions for performing the method in the first aspect or the implementations of the first aspect.

According to an eighth aspect, a computer-readable storage medium is provided. The computer-readable medium stores program code to be executed by a device, where the program code includes instructions for performing the method in the second aspect or the implementations of the second aspect.

According to a ninth aspect, an embodiment of this application provides a computer-readable storage medium. The computer-readable storage medium stores program code, where the program code includes instructions for performing a part or all of steps in either of the methods in the first aspect or the second aspect.

According to a tenth aspect, an embodiment of this application provides a computer program product. When the computer program product is run on a computer, the computer is enabled to perform a part or all of the steps in either of the methods in the first aspect or the second aspect.

In embodiments of this application, filtering processing is performed on the frequency-domain coefficient of the current frame to obtain the filtering parameter, and filtering processing is performed on the frequency-domain coefficient of the current frame and the reference frequency-domain coefficient based on the filtering parameter, so that bits written into a bitstream can be reduced, and compression efficiency in encoding/decoding can be improved. Therefore, audio signal encoding/decoding efficiency can be improved.

DESCRIPTION OF EMBODIMENTS

The following describes technical solutions of this application with reference to the accompanying drawings.

An audio signal in embodiments of this application may be a mono audio signal, or may be a stereo signal. The stereo signal may be an original stereo signal, may be a stereo signal including two channels of signals (a left channel signal and a right channel signal) included in a multi-channel signal, or may be a stereo signal including two channels of signals generated by at least three channels of signals included in a multi-channel signal. This is not limited in embodiments of this application.

For ease of description, only a stereo signal (including a left channel signal and a right channel signal) is used as an example for description in embodiments of this application. A person skilled in the art may understand that the following embodiments are merely examples rather than limitations. The solutions in embodiments of this application are also applicable to a mono audio signal and another stereo signal. This is not limited in embodiments of this application.

Figure 1:
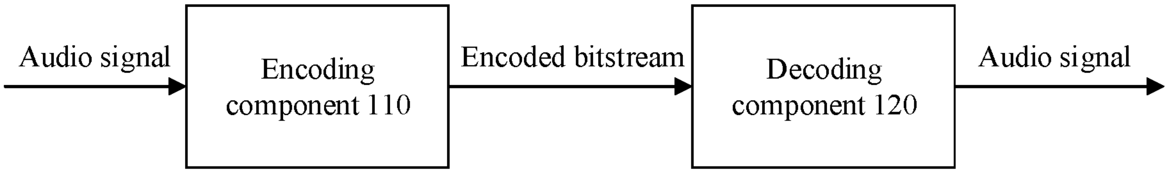
FIG. 1 is a schematic diagram of a structure of an audio signal encoding/decoding system.

FIG. 1 is a schematic diagram of a structure of an audio encoding/decoding system according to an example embodiment of this application. The audio encoding/decoding system includes an encoding component 110 and a decoding component 120.

The encoding component 110 is configured to encode a current frame (an audio signal) in frequency domain. Optionally, the encoding component 110 may be implemented by software, may be implemented by hardware, or may be implemented in a form of a combination of software and hardware. This is not limited in this embodiment of this application.

Figure 2:
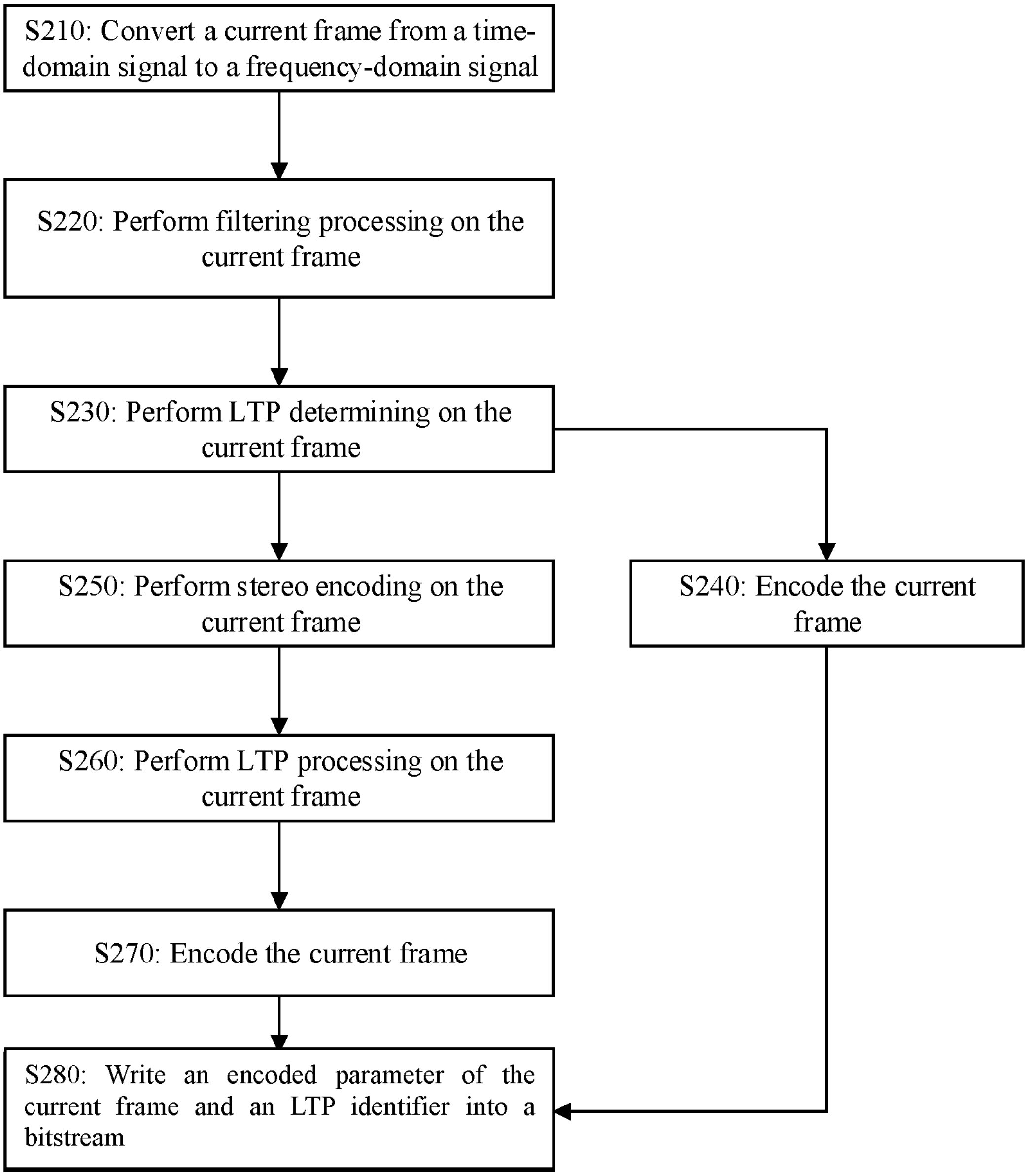
FIG. 2 is a schematic flowchart of an audio signal encoding method.

When the encoding component 110 encodes the current frame in frequency domain, in a possible implementation, steps shown in FIG. 2 may be included.

S210: Convert the current frame from a time-domain signal to a frequency-domain signal.

S220: Perform filtering processing on the current frame to obtain a frequency-domain coefficient of the current frame.

S230: Perform long-term prediction (LTP) determining on the current frame to obtain an LTP identifier.

When the LTP identifier is a first value (for example, the LTP identifier is 1), S250 may be performed; or when the LTP identifier is a second value (for example, the LTP identifier is 0), S240 may be performed.

S240: Encode the frequency-domain coefficient of the current frame to obtain an encoded parameter of the current frame. Then, S280 may be performed.

S250: Perform stereo encoding on the current frame to obtain a frequency-domain coefficient of the current frame.

S260: Perform LTP processing on the frequency-domain coefficient of the current frame to obtain a residual frequency-domain coefficient of the current frame.

S270: Encode the residual frequency-domain coefficient of the current frame to obtain an encoded parameter of the current frame.

S280: Write the encoded parameter of the current frame and the LTP identifier into a bitstream.

It should be noted that the encoding method shown in FIG. 2 is merely an example rather than a limitation. An order of performing the steps in FIG. 2 is not limited in this embodiment of this application. The encoding method shown in FIG. 2 may alternatively include more or fewer steps. This is not limited in this embodiment of this application.

For example, in the encoding method shown in FIG. 2, alternatively, S250 may be performed first to perform LTP processing on the current frame, and then S260 is performed to perform stereo encoding on the current frame.

For another example, the encoding method shown in FIG. 2 may alternatively be used to encode a mono signal. In this case, S250 may not be performed in the encoding method shown in FIG. 2, that is, no stereo encoding is performed on the mono signal.

The decoding component 120 is configured to decode an encoded bitstream generated by the encoding component 110, to obtain an audio signal of the current frame.

Optionally, the encoding component 110 may be connected to the decoding component 120 in a wired or wireless manner, and the decoding component 120 may obtain, through a connection between the decoding component 120 and the encoding component 110, the encoded bitstream generated by the encoding component 110. Alternatively, the encoding component 110 may store the generated encoded bitstream into a memory, and the decoding component 120 reads the encoded bitstream in the memory.

Optionally, the decoding component 120 may be implemented by software, may be implemented by hardware, or may be implemented in a form of a combination of software and hardware. This is not limited in this embodiment of this application.

Figure 3:
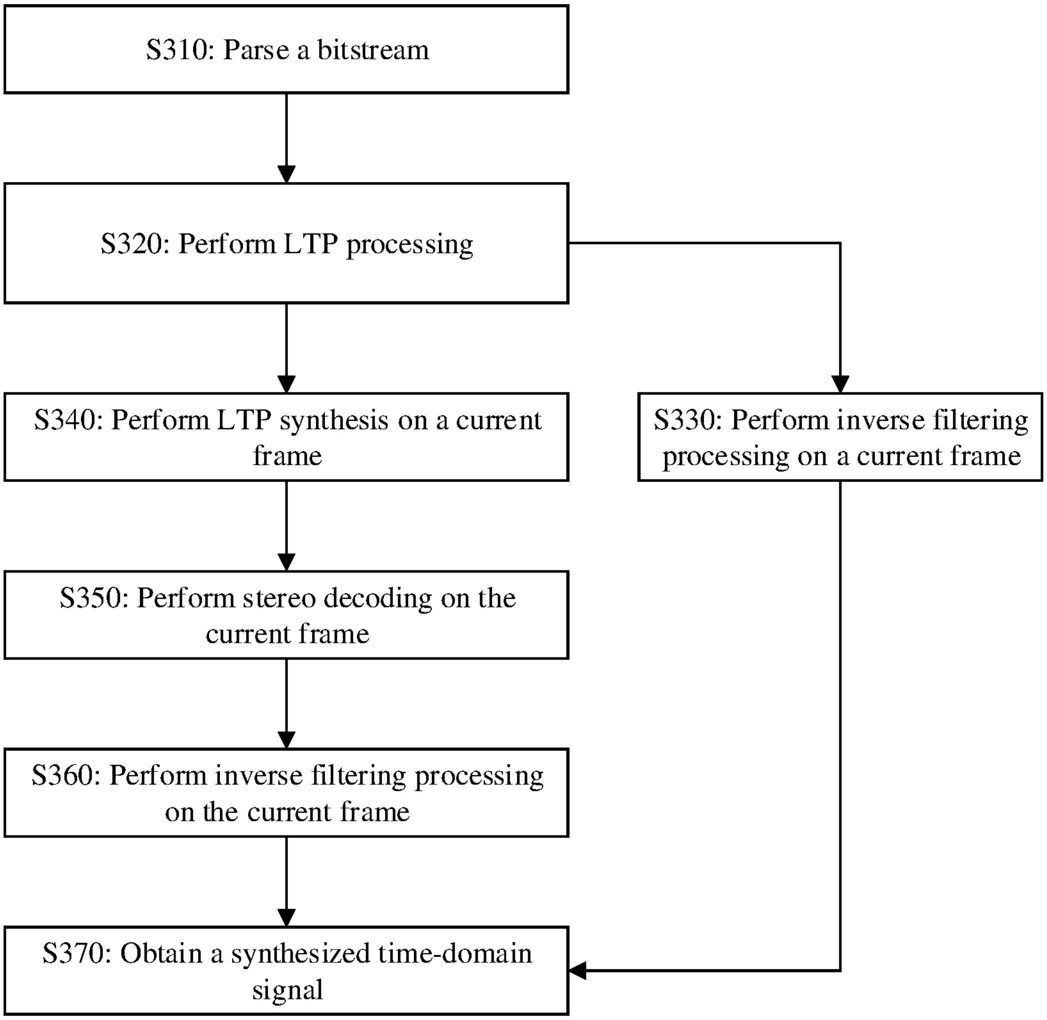
FIG. 3 is a schematic flowchart of an audio signal decoding method.

When the decoding component 120 decodes a current frame (an audio signal) in frequency domain, in a possible implementation, steps shown in FIG. 3 may be included.

S310: Parse a bitstream to obtain an encoded parameter of the current frame and an LTP identifier.

S320: Perform LTP processing based on the LTP identifier to determine whether to perform LTP synthesis on the encoded parameter of the current frame.

When the LTP identifier is a first value (for example, the LTP identifier is 1), a residual frequency-domain coefficient of the current frame is obtained by parsing the bitstream in S310. In this case, S340 may be performed. When the LTP identifier is a second value (for example, the LTP identifier is 0), a target frequency-domain coefficient of the current frame is obtained by parsing the bitstream in S310. In this case, S330 may be performed.

S330: Perform inverse filtering processing on the target frequency-domain coefficient of the current frame to obtain a frequency-domain coefficient of the current frame. Then, S370 may be performed.

S340: Perform LTP synthesis on the residual frequency-domain coefficient of the current frame to obtain an updated residual frequency-domain coefficient.

S350: Perform stereo decoding on the updated residual frequency-domain coefficient to obtain a target frequency-domain coefficient of the current frame.

S360: Perform inverse filtering processing on the target frequency-domain coefficient of the current frame to obtain a frequency-domain coefficient of the current frame.

S370: Convert the frequency-domain coefficient of the current frame to obtain a synthesized time-domain signal.

It should be noted that the decoding method shown in FIG. 3 is merely an example rather than a limitation. An order of performing the steps in FIG. 3 is not limited in this embodiment. The decoding method shown in FIG. 3 may alternatively include more or fewer steps. This is not limited in this embodiment of this application.

For example, in the decoding method shown in FIG. 3, alternatively, S350 may be performed first to perform stereo decoding on the residual frequency-domain coefficient, and then S340 is performed to perform LTP synthesis on the residual frequency-domain coefficient.

For another example, the decoding method shown in FIG. 3 may alternatively be used to decode a mono signal. In this case, S350 may not be performed in the decoding method shown in FIG. 3, that is, no stereo decoding is performed on the mono signal.

Optionally, the encoding component 110 and the decoding component 120 may be disposed in a same device, or may be disposed in different devices. The device may be a terminal having an audio signal processing function, for example, a mobile phone, a tablet computer, a laptop portable computer, a desktop computer, a Bluetooth speaker, a recording pen, or a wearable device. Alternatively, the device may be a network element having an audio signal processing capability in a core network or a wireless network. This is not limited in this embodiment.

Figure 4:
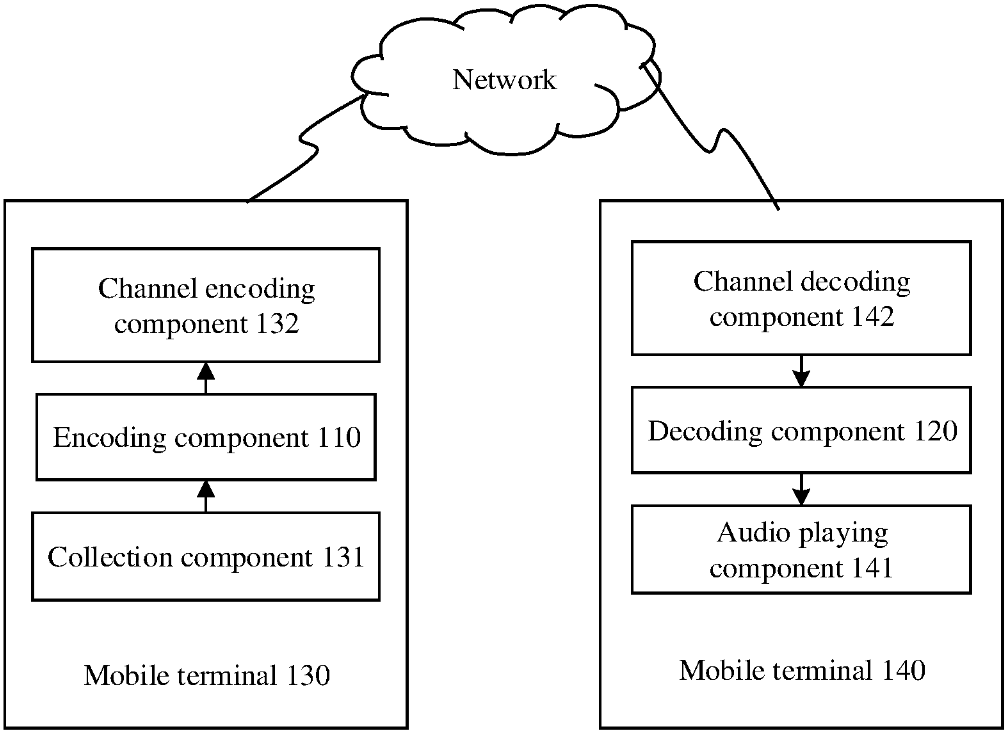
FIG. 4 is a schematic diagram of a mobile terminal according to an embodiment of this application.

For example, as shown in FIG. 4, the following example is used for description in this embodiment. The encoding component 110 is disposed in a mobile terminal 130, and the decoding component 120 is disposed in a mobile terminal 140. The mobile terminal 130 and the mobile terminal 140 are mutually independent electronic devices having an audio signal processing capability, for example, may be mobile phones, wearable devices, virtual reality (VR) devices, or augmented reality (AR) devices. In addition, the mobile terminal 130 and the mobile terminal 140 are connected by using a wireless or wired network.

Optionally, the mobile terminal 130 may include a collection component 131, an encoding component 110, and a channel encoding component 132. The collection component 131 is connected to the encoding component 110, and the encoding component 110 is connected to the encoding component 132.

Optionally, the mobile terminal 140 may include an audio playing component 141, the decoding component 120, and a channel decoding component 142. The audio playing component 141 is connected to the decoding component 120, and the decoding component 120 is connected to the channel decoding component 142.

After collecting an audio signal by using the collection component 131, the mobile terminal 130 encodes the audio signal by using the encoding component 110, to obtain an encoded bitstream; and then encodes the encoded bitstream by using the channel encoding component 132, to obtain a to-be-transmitted signal.

The mobile terminal 130 sends the to-be-transmitted signal to the mobile terminal 140 by using the wireless or wired network.

After receiving the to-be-transmitted signal, the mobile terminal 140 decodes the to-be-transmitted signal by using the channel decoding component 142, to obtain the encoded bitstream; decodes the encoded bitstream by using the decoding component 120, to obtain the audio signal; and plays the audio signal by using the audio playing component. It may be understood that the mobile terminal 130 may alternatively include the components included in the mobile terminal 140, and the mobile terminal 140 may alternatively include the components included in the mobile terminal 130.

Figure 5:
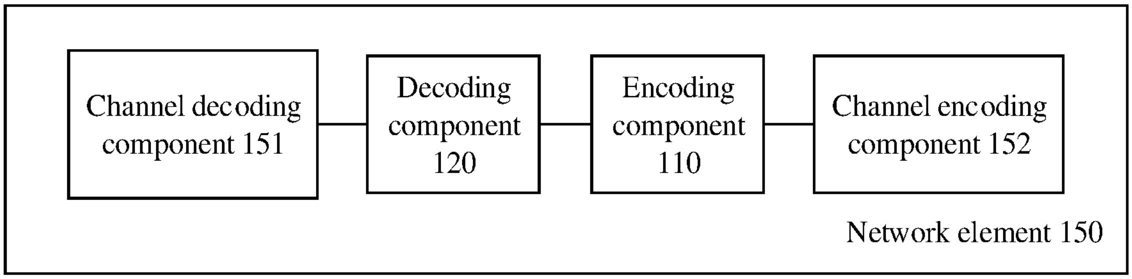
FIG. 5 is a schematic diagram of a network element according to an embodiment of this application.

For example, as shown in FIG. 5, the following example is used for description: The encoding component 110 and the decoding component 120 are disposed in one network element 150 having an audio signal processing capability in a core network or wireless network.

Optionally, the network element 150 includes a channel decoding component 151, the decoding component 120, the encoding component 110, and a channel encoding component 152. The channel decoding component 151 is connected to the decoding component 120, the decoding component 120 is connected to the encoding component 110, and the encoding component 110 is connected to the channel encoding component 152.

After receiving a to-be-transmitted signal sent by another device, the channel decoding component 151 decodes the to-be-transmitted signal to obtain a first encoded bitstream; the decoding component 120 decodes the encoded bitstream to obtain an audio signal; the encoding component 110 encodes the audio signal to obtain a second encoded bitstream; and the channel encoding component 152 encodes the second encoded bitstream to obtain the to-be-transmitted signal.

The another device may be a mobile terminal having an audio signal processing capability, or may be another network element having an audio signal processing capability. This is not limited in this embodiment.

Optionally, the encoding component 110 and the decoding component 120 in the network element may transcode an encoded bitstream sent by the mobile terminal.

Optionally, in this embodiment, a device on which the encoding component 110 is installed may be referred to as an audio encoding device. In actual implementation, the audio encoding device may also have an audio decoding function. This is not limited in this embodiment of this application.

Optionally, this embodiment is described by using only a stereo signal as an example. In this application, the audio encoding device may further process a mono signal or a multi-channel signal, and the multi-channel signal includes at least two channels of signals.

This application provides an audio signal encoding method and apparatus, and an audio signal decoding method and apparatus. Filtering processing is performed on a frequency-domain coefficient of a current frame to obtain a filtering parameter, and filtering processing is performed on the frequency-domain coefficient of the current frame and a reference frequency-domain coefficient based on the filtering parameter, so that bits written into a bitstream can be reduced, and compression efficiency in encoding/decoding can be improved. Therefore, audio signal encoding/decoding efficiency can be improved.

Figure 6:
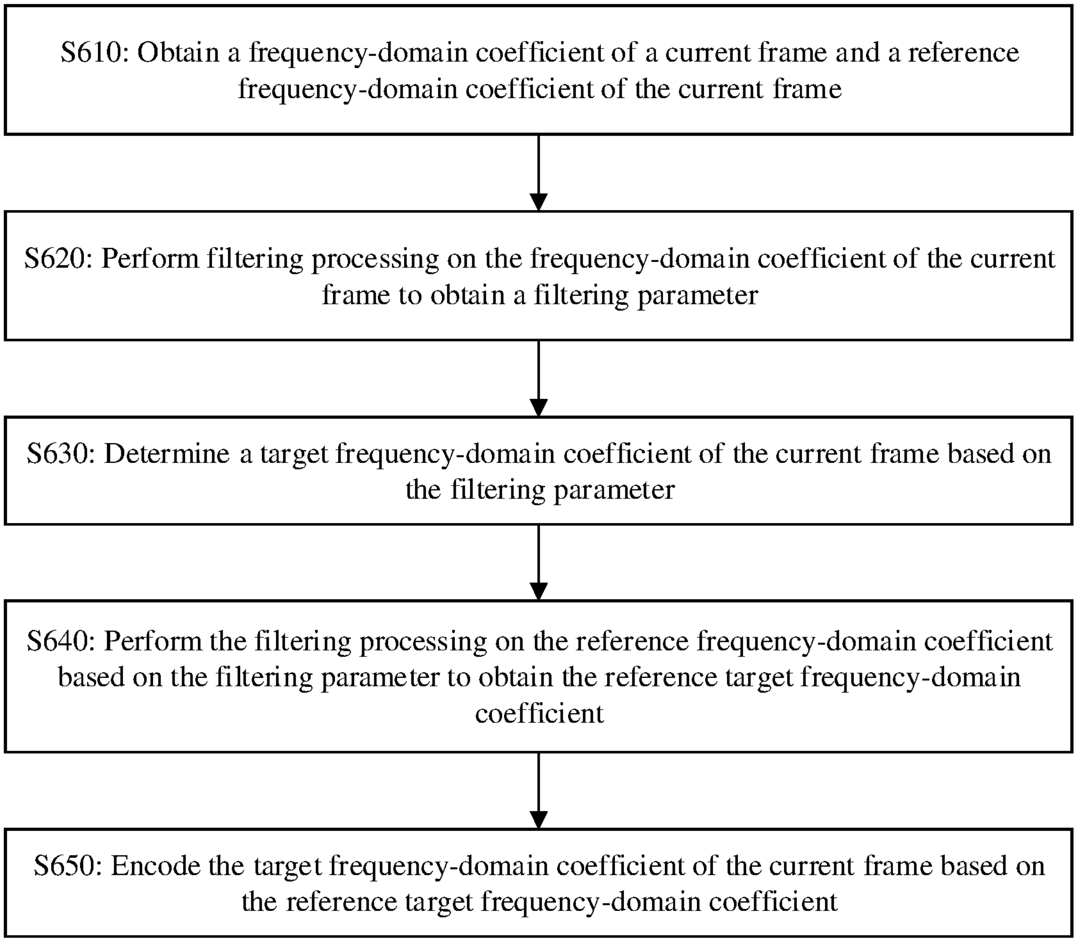
FIG. 6 is a schematic flowchart of an audio signal encoding method according to an embodiment of this application.

FIG. 6 is a schematic flowchart of an audio signal encoding method 600 according to an embodiment of this application. The method 600 may be performed by an encoder side. The encoder side may be an encoder or a device having an audio signal encoding function. The method 600 specifically includes the following steps.

S610: Obtain a frequency-domain coefficient of a current frame and a reference frequency-domain coefficient of the current frame.

Optionally, a time-domain signal of the current frame may be converted to obtain a frequency-domain coefficient of the current frame.

For example, modified discrete cosine transform (MDCT) may be performed on the time-domain signal of the current frame to obtain an MDCT coefficient of the current frame. The MDCT coefficient of the current frame may also be considered as the frequency-domain coefficient of the current frame.

The reference frequency-domain coefficient may be a frequency-domain coefficient of a reference signal of the current frame.

Optionally, a pitch period of the current frame may be determined, the reference signal of the current frame is determined based on the pitch period of the current frame, and the reference frequency-domain coefficient of the current frame can be obtained by converting the reference signal of the current frame. The conversion performed on the reference signal of the current frame may be time to frequency domain transform, for example, MDCT transform.

For example, pitch period search may be performed on the current frame to obtain the pitch period of the current frame, the reference signal of the current frame is determined based on the pitch period of the current frame, and MDCT transform is performed on the reference signal of the current frame to obtain an MDCT coefficient of the reference signal of the current frame. The MDCT coefficient of the reference signal of the current frame may also be considered as the reference frequency-domain coefficient of the current frame.

S620: Perform filtering processing on the frequency-domain coefficient of the current frame to obtain a filtering parameter.

Optionally, the filtering parameter may be used to perform filtering processing on the frequency-domain coefficient of the current frame.

The filtering processing may include temporary noise shaping (TNS) processing and/or frequency-domain noise shaping (FDNS) processing, or the filtering processing may include other processing. This is not limited in this embodiment of this application.

S630: Determine a target frequency-domain coefficient of the current frame based on the filtering parameter.

Optionally, the filtering processing may be performed on the frequency-domain coefficient of the current frame based on the filtering parameter (the filtering parameter obtained in the foregoing S620), to obtain a filtering-processed frequency-domain coefficient of the current frame, that is, the target frequency-domain coefficient of the current frame.

S640: Perform the filtering processing on the reference frequency-domain coefficient based on the filtering parameter to obtain the reference target frequency-domain coefficient.

Optionally, the filtering processing may be performed on the reference frequency-domain coefficient based on the filtering parameter (the filtering parameter obtained in the foregoing S620), to obtain a filtering-processed reference frequency-domain coefficient, that is, the reference target frequency-domain coefficient.

S650: Encode the target frequency-domain coefficient of the current frame based on the reference target frequency-domain coefficient.

Optionally, long-term prediction (LTP) determining may be performed based on the target frequency-domain coefficient and the reference target frequency-domain coefficient of the current frame to obtain a value of an LTP identifier of the current frame, the target frequency-domain coefficient of the current frame may be encoded based on the value of the LTP identifier of the current frame, and the value of the LTP identifier of the current frame may be written into a bitstream.

The LTP identifier may be used to indicate whether to perform LTP processing on the current frame.

For example, when the LTP identifier is 0, the LTP identifier may be used to indicate not to perform LTP processing on the current frame, that is, disable an LTP module; or when the LTP identifier is 1, the LTP identifier may be used to indicate to perform LTP processing on the current frame, that is, enable an LTP module.

Optionally, the current frame may include a first channel and a second channel.

The first channel may be a left channel of the current frame, and the second channel may be a right channel of the current frame; or the first channel may be an M channel of a mid/side stereo signal, and the second channel may be an S channel of a mid/side stereo signal.

Optionally, when the current frame includes the first channel and the second channel, the LTP identifier of the current frame may be used for indication in the following two manners.

Manner 1:

The LTP identifier of the current frame may be used to indicate whether to perform LTP processing on both the first channel and the second channel.

For example, when the LTP identifier is 0, the LTP identifier may be used to indicate to perform LTP processing neither on the first channel nor on the second channel, that is, to disable both an LTP module of the first channel and an LTP module of the second channel; or when the LTP identifier is 1, the LTP identifier may be used to indicate to perform LTP processing on the first channel and the second channel, that is, to enable both an LTP module of the first channel and an LTP module of the second channel.

Manner 2:

The LTP identifier of the current frame may include an LTP identifier of the first channel and an LTP identifier of the second channel. The LTP identifier of the first channel may be used to indicate whether to perform LTP processing on the first channel, and the LTP identifier of the second channel may be used to indicate whether to perform LTP processing on the second channel.

For example, when the LTP identifier of the first channel is 0, the LTP identifier of the first channel may be used to indicate not to perform LTP processing on the first channel, that is, disable an LTP module of the first channel; and when the LTP identifier of the second channel is 0, the LTP identifier of the second channel may be used to indicate not to perform LTP processing on the second channel signal, that is, disable an LTP module of the second channel signal. Alternatively, when the LTP identifier of the first channel is 1, the LTP identifier of the first channel may be used to indicate to perform LTP processing on the first channel, that is, enable an LTP module of the first channel; and when the LTP identifier of the second channel is 1, the LTP identifier of the second channel may be used to indicate to perform LTP processing on the second channel, that is, enable an LTP module of the second channel.

Optionally, the encoding the target frequency-domain coefficient of the current frame based on the LTP identifier of the current frame may include:

When the LTP identifier of the current frame is a first value, for example, the first value is 1, LTP processing may be performed on the target frequency-domain coefficient and the reference target frequency-domain coefficient of the current frame to obtain a residual frequency-domain coefficient of the current frame, and the residual frequency-domain coefficient of the current frame may be encoded. Alternatively, when the LTP identifier of the current frame is a second value, for example, the second value is 0, the target frequency-domain coefficient of the current frame may be directly encoded (instead of encoding the residual frequency-domain coefficient of the current frame after the residual frequency-domain coefficient of the current frame is obtained by performing LTP processing on the current frame).

Optionally, when the LTP identifier of the current frame is a first value, the encoding the target frequency-domain coefficient of the current frame based on the LTP identifier of the current frame may include:

performing stereo determining on a target frequency-domain coefficient of the first channel and a target frequency-domain coefficient of the second channel to obtain a stereo coding identifier of the current frame; performing LTP processing on the target frequency-domain coefficient of the first channel, the target frequency-domain coefficient of the second channel, and the reference target frequency-domain coefficient based on the stereo coding identifier of the current frame, to obtain a residual frequency-domain coefficient of the first channel and a residual frequency-domain coefficient of the second channel; and encoding the residual frequency-domain coefficient of the first channel and the residual frequency-domain coefficient of the second channel.

The stereo coding identifier may be used to indicate whether to perform stereo encoding on the current frame.

For example, when the stereo coding identifier is 0, the stereo coding identifier is used to indicate not to perform mid/side stereo encoding on the current frame. In this case, the first channel may be the left channel of the current frame, and the second channel may be the right channel of the current frame. When the stereo coding identifier is 1, the stereo coding identifier is used to indicate to perform mid/side stereo encoding on the current frame. In this case, the first channel may be the mid/side stereo of the M channel, and the second channel may be the mid/side stereo of the S channel.

Specifically, when the stereo coding identifier is a first value (for example, the first value is 1), stereo encoding may be performed on the reference target frequency-domain coefficient to obtain an encoded reference target frequency-domain coefficient; and LTP processing may be performed on the target frequency-domain coefficient of the first channel, the target frequency-domain coefficient of the second channel, and the encoded reference target frequency-domain coefficient to obtain the residual frequency-domain coefficient of the first channel and the residual frequency-domain coefficient of the second channel.

Alternatively, when the stereo coding identifier is a second value (for example, the second value is 0), LTP processing may be performed on the target frequency-domain coefficient of the first channel, the target frequency-domain coefficient of the second channel, and the reference target frequency-domain coefficient to obtain the residual frequency-domain coefficient of the first channel and the residual frequency-domain coefficient of the second channel.

Optionally, in the process of performing stereo determining on a target frequency-domain coefficient of the first channel and a target frequency-domain coefficient of the second channel, mid/side stereo signals of the current frame may be further determined based on the target frequency-domain coefficient of the first channel and the target frequency-domain coefficient of the second channel.

Optionally, the performing LTP processing on the target frequency-domain coefficient and the reference target frequency-domain coefficient of the current frame based on the LTP identifier of the current frame and the stereo coding identifier of the current frame may include:

when the LTP identifier of the current frame is 1 and the stereo coding identifier is 0, performing LTP processing on the target frequency-domain coefficient of the first channel and the target frequency-domain coefficient of the second channel signal to obtain the residual frequency-domain coefficient of the first channel and the residual frequency-domain coefficient of the second channel; or when the LTP identifier of the current frame is 1 and the stereo coding identifier is 1, performing LTP processing on the mid/side stereo signals of the current frame to obtain a residual frequency-domain coefficient of the M channel and a residual frequency-domain coefficient of the S channel.

Alternatively, when the LTP identifier of the current frame is the first value, the encoding the target frequency-domain coefficient of the current frame based on the LTP identifier of the current frame may include:

performing LTP processing on a target frequency-domain coefficient of the first channel and a target frequency-domain coefficient of the second channel based on the LTP identifier of the current frame to obtain a residual frequency-domain coefficient of the first channel and a residual frequency-domain coefficient of the second channel; performing stereo determining on the residual frequency-domain coefficient of the first channel and the residual frequency-domain coefficient of the second channel to obtain a stereo coding identifier of the current frame, where the stereo coding identifier is used to indicate whether to perform stereo encoding on the current frame; and encoding the residual frequency-domain coefficient of the first channel and the residual frequency-domain coefficient of the second channel based on the stereo coding identifier of the current frame.

Similarly, the stereo coding identifier may be used to indicate whether to perform stereo encoding on the current frame. For a specific example, refer to the description in the foregoing embodiment. Details are not described herein again.

Similarly, in the process of performing stereo determining on a target frequency-domain coefficient of the first channel and a target frequency-domain coefficient of the second channel, mid/side stereo signals of the current frame may be further determined based on the target frequency-domain coefficient of the first channel and the target frequency-domain coefficient of the second channel.

Specifically, when the stereo coding identifier is a first value, stereo encoding may be performed on the reference target frequency-domain coefficient to obtain an encoded reference target frequency-domain coefficient; update processing is performed on the residual frequency-domain coefficient of the first channel and the residual frequency-domain coefficient of the second channel based on the encoded reference target frequency-domain coefficient to obtain an updated residual frequency-domain coefficient of the first channel and an updated residual frequency-domain coefficient of the second channel; and the updated residual frequency-domain coefficient of the first channel and the updated residual frequency-domain coefficient of the second channel are encoded.

Alternatively, when the stereo coding identifier is a second value, the residual frequency-domain coefficient of the first channel and the residual frequency-domain coefficient of the second channel may be encoded.

Optionally, when the LTP identifier of the current frame is the second value, an intensity level difference (ILD) between the first channel and the second channel may be further calculated; and energy of the first channel or energy of the second channel is adjusted based on the calculated ILD, that is, an adjusted target frequency-domain coefficient of the first channel and an adjusted target frequency-domain coefficient of the second channel are obtained.

It should be noted that when the LTP identifier of the current frame is the first value, there is no need to calculate the intensity level difference (ILD) between the first channel and the second channel. In this case, there is no need to adjust the energy of the first channel or the energy of the second channel (based on the ILD), either.

Figure 7:
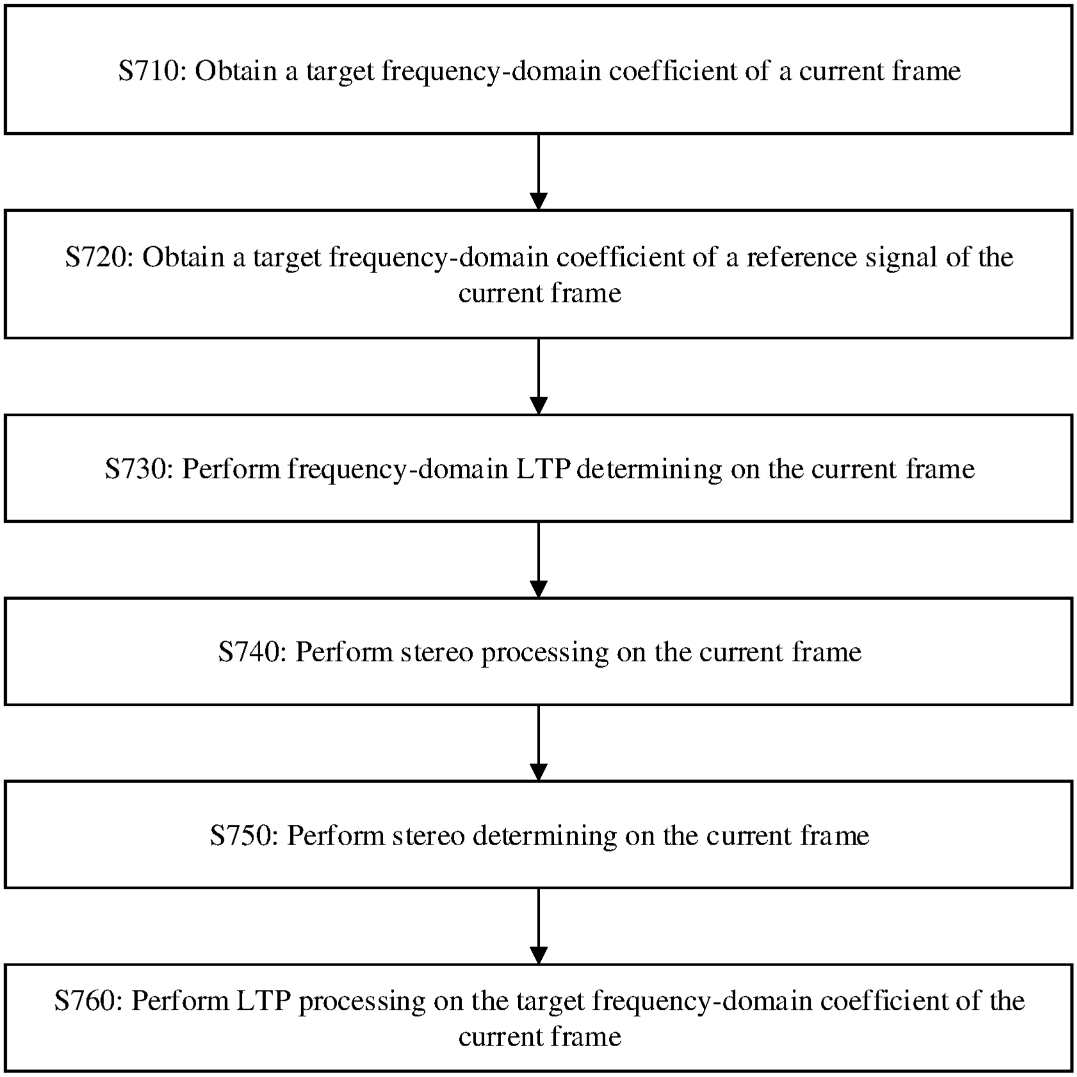
FIG. 7 is a schematic flowchart of an audio signal encoding method according to another embodiment of this application.

With reference to FIG. 7, the following describes a detailed process of an audio signal encoding method in an embodiment of this application by using a stereo signal (that is, a current frame includes a left channel signal and a right channel signal) as an example.

It should be understood that the embodiment shown in FIG. 7 is merely an example rather than a limitation. An audio signal in this embodiment may alternatively be a mono signal or a multi-channel signal. This is not limited in this embodiment of this application.

FIG. 7 is a schematic flowchart of the audio signal encoding method 700 according to this embodiment. The method 700 may be performed by an encoder side. The encoder side may be an encoder or a device having an audio signal encoding function. The method 700 specifically includes the following steps.

S710: Obtain a target frequency-domain coefficient of a current frame.

Optionally, a left channel signal and a right channel signal of the current frame may be converted from a time domain to a frequency domain through MDCT transform to obtain an MDCT coefficient of the left channel signal and an MDCT coefficient of the right channel signal, that is, a frequency-domain coefficient of the left channel signal and a frequency-domain coefficient of the right channel signal.

Then, TNS processing may be performed on a frequency-domain coefficient of the current frame to obtain a linear prediction coding (LPC) coefficient (that is, a TNS parameter), so as to achieve an objective of performing noise shaping on the current frame. The TNS processing is to perform LPC analysis on the frequency-domain coefficient of the current frame. For a specific LPC analysis method, refer to a conventional technology. Details are not described herein.

In addition, because TNS processing is not suitable for all frames of signals, a TNS identifier may be further used to indicate whether to perform TNS processing on the current frame. For example, when the TNS identifier is 0, no TNS processing is performed on the current frame. When the TNS identifier is 1, TNS processing is performed on the frequency-domain coefficient of the current frame by using the obtained LPC coefficient, to obtain a processed frequency-domain coefficient of the current frame. The TNS identifier is obtained through calculation based on input signals (that is, the left channel signal and the right channel signal of the current frame) of the current frame. For a specific method, refer to the conventional technology. Details are not described herein.

Then, FDNS processing may be further performed on the processed frequency-domain coefficient of the current frame to obtain a time-domain LPC coefficient. Then, the time-domain LPC coefficient is converted to a frequency domain to obtain a frequency-domain FDNS parameter. The FDNS processing belongs to a frequency-domain noise shaping technology. In an implementation, an energy spectrum of the processed frequency-domain coefficient of the current frame is calculated, an autocorrelation coefficient is obtained based on the energy spectrum, the time-domain LPC coefficient is obtained based on the autocorrelation coefficient, and the time-domain LPC coefficient is then converted to the frequency domain to obtain the frequency-domain FDNS parameter. For a specific FDNS processing method, refer to the conventional technology. Details are not described herein.

It should be noted that an order of performing TNS processing and FDNS processing is not limited in this embodiment. For example, alternatively, FDNS processing may be performed on the frequency-domain coefficient of the current frame before TNS processing. This is not limited in this embodiment of this application.

In this embodiment, for ease of understanding, the TNS parameter and the FDNS parameter may also be referred to as filtering parameters, and the TNS processing and the FDNS processing may also be referred to as filtering processing.

In this case, the frequency-domain coefficient of the current frame may be processed based on the TNS parameter and the FDNS parameter, to obtain the target frequency-domain coefficient of the current frame.

For ease of description, in this embodiment, the target frequency-domain coefficient of the current frame may be expressed as X[k]. The target frequency-domain coefficient of the current frame may include a target frequency-domain coefficient of the left channel signal and a target frequency-domain coefficient of the right channel signal. The target frequency-domain coefficient of the left channel signal may be expressed as $X_L[k]$, and the target frequency-domain coefficient of the right channel signal may be expressed as $X_R[k]$, where k=0, 1, . . . , W, both k and W are positive integers, $0 \le k \le W$, and W may represent a quantity of points on which MDCT transform needs to be performed (or W may represent a quantity of MDCT coefficients that need to be encoded).

S720: Obtain a reference target frequency-domain coefficient of a reference signal of the current frame.

Optionally, an optimal pitch period may be obtained by searching pitch periods, and a reference signal ref[j] of the current frame is obtained from a history buffer based on the optimal pitch period. Any pitch period searching method may be used to search the pitch periods. This is not limited in this embodiment of this application.

$$\text{ref}[j]=syn[L-N-K+j], j=0,1, \ldots, N-1$$

A history buffer signal Syn stores a synthesized time-domain signal obtained through inverse MDCT transform, a length satisfies L=2N, N represents a frame length, and K represents a pitch period.

For the history buffer signal syn, an arithmetic-coded residual frequency-domain coefficient is decoded, LTP synthesis is performed, inverse TNS processing and inverse FDNS processing are performed based on the TNS parameter and the FDNS parameter that are obtained in S710, inverse MDCT transform is then performed to obtain a synthesized time-domain signal. The synthesized time-domain signal is stored in the history buffer. Inverse TNS processing is an inverse operation of TNS processing (filtering), to obtain a signal that has not undergone TNS processing. Inverse FDNS processing is an inverse operation of FDNS processing (filtering), to obtain a signal that has not undergone FDNS processing. For specific methods for performing inverse TNS processing and inverse FDNS processing, refer to the conventional technology. Details are not described herein.

Optionally, MDCT transform is performed on the reference signal ref[j], and filtering processing is performed on a frequency-domain coefficient of the reference signal ref[j] based on the filtering parameter (obtained after the frequency-domain coefficient X[k] of the current frame is analyzed) obtained in S710.

First, TNS processing may be performed on an MDCT coefficient of the reference signal ref[j] based on the TNS identifier and the TNS parameter (obtained after the frequency-domain coefficient X[k] of the current frame is analyzed) obtained in S710, to obtain a TNS-processed reference frequency-domain coefficient.

For example, when the TNS identifier is 1, TNS processing is performed on the MDCT coefficient of the reference signal based on the TNS parameter.

Then, FDNS processing may be performed on the TNS-processed reference frequency-domain coefficient based on the FDNS parameter (obtained after the frequency-domain coefficient X[k] of the current frame is analyzed) obtained in S710, to obtain an FDNS-processed reference frequency-domain coefficient, that is, the reference target frequency-domain coefficient $X_{ref}[k]$.

It should be noted that an order of performing TNS processing and FDNS processing is not limited in this embodiment of this application. For example, alternatively, FDNS processing may be performed on the reference frequency-domain coefficient (that is, the MDCT coefficient of the reference signal) before TNS processing. This is not limited in this embodiment of this application.

S730: Perform frequency-domain LTP determining on the current frame.

Optionally, an LTP-predicted gain of the current frame may be calculated based on the target frequency-domain coefficient X[k] and the reference target frequency-domain coefficient $X_{ref}[k]$ of the current frame.

For example, the following formula may be used to calculate an LTP-predicted gain of the left channel signal (or the right channel signal) of the current frame:

$$g_i = \frac{\sum_{k=0}^{M-1} X_{ref}[k] * X[k]}{\sum_{k=0}^{M-1} X_{ref}[k] * X_{ref}[k]}$$

$g_i$ may be an LTP-predicted gain of an $i^{th}$ subframe of the left channel signal (or the right channel signal), M represents a quantity of MDCT coefficients participating in LTP processing, k is a positive integer, and 0≤k≤M. It should be noted that, in this embodiment, a part of frames may be divided into several subframes, and a part of frames have only one subframe. For ease of description, the $i^{th}$ subframe is used for description herein. When there is only one subframe, i is equal to 0.

Optionally, the LTP identifier of the current frame may be determined based on the LTP-predicted gain of the current frame. The LTP identifier may be used to indicate whether to perform LTP processing on the current frame.

It should be noted that when the current frame includes the left channel signal and the right channel signal, the LTP identifier of the current frame may be used for indication in the following two manners.

Manner 1:

The LTP identifier of the current frame may be used to indicate whether to perform LTP processing on both the left channel signal and the right channel signal of the current frame.

The LTP identifier may further include the first identifier and/or the second identifier described in the embodiment of the method 600 in FIG. 6.

For example, the LTP identifier may include the first identifier and the second identifier. The first identifier may be used to indicate whether to perform LTP processing on the current frame, and the second identifier may be used to indicate a frequency band on which LTP processing is to be performed and that is of the current frame.

For another example, the LTP identifier may be the first identifier. The first identifier may be used to indicate whether to perform LTP processing on the current frame. In addition, when LTP processing is performed on the current frame, the first identifier may further indicate a frequency band (for example, a high frequency band, a low frequency band, or a full frequency band of the current frame) on which LTP processing is performed and that is of the current frame.

Manner 2:

The LTP identifier of the current frame may include an LTP identifier of a left channel and an LTP identifier of a right channel. The LTP identifier of the left channel may be used to indicate whether to perform LTP processing on the left channel signal, and the LTP identifier of the right channel may be used to indicate whether to perform LTP processing on the right channel signal.

Further, as described in the embodiment of the method 600 in FIG. 6, the LTP identifier of the left channel may include a first identifier of the left channel and/or a second identifier of the left channel, and the LTP identifier of the right channel may include a first identifier of the right channel and/or a second identifier of the right channel.

The following provides description by using the LTP identifier of the left channel as an example. The LTP identifier of the right channel is similar to the LTP identifier of the left channel. Details are not described herein.

For example, the LTP identifier of the left channel may include the first identifier of the left channel and the second identifier of the left channel. The first identifier of the left channel may be used to indicate whether to perform LTP processing on the left channel, and the second identifier may be used to indicate a frequency band on which LTP processing is performed and that is of the left channel.

For another example, the LTP identifier of the left channel may be the first identifier of the left channel. The first identifier of the left channel may be used to indicate whether to perform LTP processing on the left channel. In addition, when LTP processing is performed on the left channel, the first identifier of the left channel may further indicate a frequency band (for example, a high frequency band, a low frequency band, or a full frequency band of the left channel) on which LTP processing is performed and that is of the left channel.

For specific description of the first identifier and the second identifier in the foregoing two manners, refer to the embodiment in FIG. 6. Details are not described herein again.

In the embodiment of the method 700, the LTP identifier of the current frame may be used for indication in Manner 1. It should be understood that the embodiment of the method 700 is merely an example rather than a limitation. The LTP identifier of the current frame in the method 700 may alternatively be used for indication in Manner 2. This is not limited in this embodiment of this application.

For example, in the method 700, an LTP-predicted gain may be calculated for each of subframes of the left channel and the right channel of the current frame. If a frequency-domain predicted gain $g_i$ of any subframe is less than a preset threshold, the LTP identifier of the current frame may be set to 0, that is, an LTP module is disabled for the current frame. In this case, the following S740 may continue to be performed, and the target frequency-domain coefficient of the current frame is directly encoded after S740 is performed. Otherwise, if a frequency-domain predicted gain of each subframe of the current frame is greater than the preset threshold, the LTP identifier of the current frame may be set to 1, that is, an LTP module is enabled for the current frame. In this case, the following S750 may be directly performed (that is, the following S740 is not performed).

The preset threshold may be set with reference to an actual situation. For example, the preset threshold may be set to 0.5, 0.4, or 0.6.

S740: Perform stereo processing on the current frame.

Optionally, an intensity level difference (ILD) between the left channel of the current frame and the right channel of the current frame may be calculated.

For example, the ILD between the left channel of the current frame and the right channel of the current frame may be calculated based on the following formula:

$$ILD = \frac{\sqrt{\sum_{k=0}^{M-1} X_L[k] * X_L[k]}}{\sqrt{\sum_{k=0}^{M-1} X_L[k] * X_L[k]} + \sqrt{\sum_{k=0}^{M-1} X_R[k] * X_R[k]}}$$

$X_L[k]$ represents the target frequency-domain coefficient of the left channel signal, $X_R[k]$ represents the target frequency-domain coefficient of the right channel signal, M represents a quantity of MDCT coefficients participating in LTP processing, k is a positive integer, and $0 \le k \le M$.

Optionally, energy of the left channel signal and energy of the right channel signal may be adjusted by using the ILD obtained through calculation based on the foregoing formula. A specific adjustment method is as follows:

A ratio of the energy of the left channel signal to the energy of the right channel signal is calculated based on the ILD.

For example, the ratio of the energy of the left channel signal to the energy of the right channel signal may be calculated based on the following formula, and the ratio may be denoted as nrgRatio:

$$nrg\text{Ratio} = \frac{1}{ILD} - 1$$

If the ratio nrgRatio is greater than 1.0, an MDCT coefficient of the right channel is adjusted based on the following formula:

$$X_{refR}[k] = \frac{X_R[k]}{nrg\text{Ratio}}$$

$X_{refR}[k]$ on the left of the formula represents an adjusted MDCT coefficient of the right channel, and $X_R[k]$ on the right of the formula represents the unadjusted MDCT coefficient of the right channel.

If nrgRatio is less than 1.0, an MDCT coefficient of the left channel is adjusted based on the following formula:

$$X_{refL}[k] = \frac{X_L[k]}{nrg\text{Ratio}}$$

$X_{refL}[k]$ on the left of the formula represents an adjusted MDCT coefficient of the left channel, and $X_L[k]$ on the right of the formula represents the unadjusted MDCT coefficient of the left channel.

Mid/side stereo (MS) signals of the current frame are adjusted based on the adjusted target frequency-domain coefficient $X_{refR}[k]$ of the right channel signal and the adjusted target frequency-domain coefficient $X_{refL}[k]$ of the left channel signal:

$$X_M[k] = (X_{refL}[k] + X_{refR}[k]) * \sqrt{2}/2$$

$$X_S[k] = (X_{refL}[k] - X_{refR}[k]) * \sqrt{2}/2$$

$X_M[k]$ represents an M channel of a mid/side stereo signal, $X_S[k]$ represents an S channel of a mid/side stereo signal, $X_{refL}[k]$ represents the adjusted target frequency-domain coefficient of the left channel signal, $X_{refR}[k]$ represents the adjusted target frequency-domain coefficient of the right channel signal, M represents the quantity of MDCT coefficients participating in LTP processing, k is a positive integer, and $0 \le k \le M$.

S750: Perform stereo determining on the current frame.

Optionally, scalar quantization and arithmetic coding may be performed on the target frequency-domain coefficient $X_L[k]$ of the left channel signal to obtain a quantity of bits required for quantizing the left channel signal. The quantity of bits required for quantizing the left channel signal may be denoted as bitL.

Optionally, scalar quantization and arithmetic coding may also be performed on the target frequency-domain coefficient $X_R[k]$ of the right channel signal to obtain a quantity of bits required for quantizing the right channel signal. The quantity of bits required for quantizing the right channel signal may be denoted as bitR.

Optionally, scalar quantization and arithmetic coding may also be performed on the mid/side stereo signal $X_M[k]$ to obtain a quantity of bits required for quantizing $X_M$ [k]. The quantity of bits required for quantizing $X_M$ [k] may be denoted as bitM.

Optionally, scalar quantization and arithmetic coding may also be performed on the mid/side stereo signal $X_S[k]$ to obtain a quantity of bits required for quantizing $X_S[k]$. The quantity of bits required for quantizing $X_S[k]$ may be denoted as bitS.

For details about the foregoing quantization process and bit estimation process, refer to the conventional technology. Details are not described herein.

In this case, if bitL+bitR is greater than bitM+bitS, a stereo coding identifier stereoMode may be set to 1, to indicate that the stereo signals $X_M[k]$ and $X_S[k]$ need to be encoded during subsequent encoding.

Otherwise, the stereo coding identifier stereoMode may be set to 0, to indicate that $X_L[k]$ and $X_R[k]$ need to be encoded during subsequent encoding.

It should be noted that, in this embodiment, LTP processing may alternatively be performed on the target frequency domain coefficient of the current frame before stereo determining is performed on an LTP-processed left channel signal and an LTP-processed right channel signal of the current frame, that is, S760 is performed before S750.

S760: Perform LTP processing on the target frequency-domain coefficient of the current frame.

Optionally, LTP processing may be performed on the target frequency-domain coefficient of the current frame in the following two cases:

Case 1:

If the LTP identifier enableRALTP of the current frame is 1 and the stereo coding identifier stereoMode is 0, LTP processing is separately performed on $X_L[k]$ and $X_R[k]$:

$$X_L[k]=X_L[k]-g_{Li}*X_{refL}[k]$$

$$X_R[K]=X_R[k]-g_{Ri}*X_{refR}[k]$$

$X_L[k]$ on the left of the formula represents an LTP-synthesized residual frequency-domain coefficient of the left channel, $X_L[k]$ on the right of the formula represents the target frequency-domain coefficient of the left channel signal, $X_R[k]$ on the left of the formula represents an LTP-synthesized residual frequency-domain coefficient of the right channel obtained, $X_R[k]$ on the right of the formula represents the target frequency-domain coefficient of the right channel signal, $X_{refL}$ represents a TNS- and FDNS-processed reference signal of the left channel, $X_{refR}$ represents a TNS- and FDNS-processed reference signal of the right channel, $g_{Li}$ may represent an LTP-predicted gain of an $i^{th}$ subframe of the left channel, $g_{Ri}$ may represent an LTP-predicted gain of an $i^{th}$ subframe of the right channel signal, M represents the quantity of MDCT coefficients participating in LTP processing, k is a positive integer, and $0 \le k \le M$.

Then, arithmetic coding may be performed on LTP-processed $X_L[k]$ and $X_R[k]$ (that is, the residual frequency-domain coefficient $X_L[k]$ of the left channel signal and the residual frequency-domain coefficient $X_R[k]$ of the right channel signal).

Case 2:

If the LTP identifier enableRALTP of the current frame is 1 and the stereo coding identifier stereoMode is 1, LTP processing is separately performed on $X_M$ [k] and $X_S[k]$:

$$X_M[k]=X_M[k]-g_{Mi}*X_{refM}[k]$$

$$X_S[k]=X_S[k]-g_{Si}*X_{refS}[k]$$

$X_M[k]$ on the left of the formula represents an LTP-synthesized residual frequency-domain coefficient of the M channel, $X_M[k]$ on the right of the formula represents a residual frequency-domain coefficient of the M channel, $X_S[k]$ on the left of the formula represents an LTP-synthesized residual frequency-domain coefficient of the S channel, $X_S[k]$ on the right of the formula represents a residual frequency-domain coefficient of the S channel, $g_{Mi}$ represents an LTP-predicted gain of an $i^{th}$ subframe of the M channel, $g_{Si}$ represents an LTP-predicted gain of an $i^{th}$ subframe of the S channel, M represents the quantity of MDCT coefficients participating in LTP processing, i and k are positive integers, $0 \le k \le M$, $X_{refM}$ and $X_{refS}$ represent reference signals obtained through mid/side stereo processing. Details are as follows:

$$X_{refM}[k]=(X_{refL}[k]+X_{refR}[k])*\sqrt{2}/2$$

$$X_{refS}[K]=(X_{refL}[k]-X_{refR}[k])*\sqrt{2}/2$$

Then, arithmetic coding may be performed on LTP-processed $X_M[k]$ and $X_S[k]$ (that is, the residual frequency-domain coefficient of the current frame).

Figure 8:
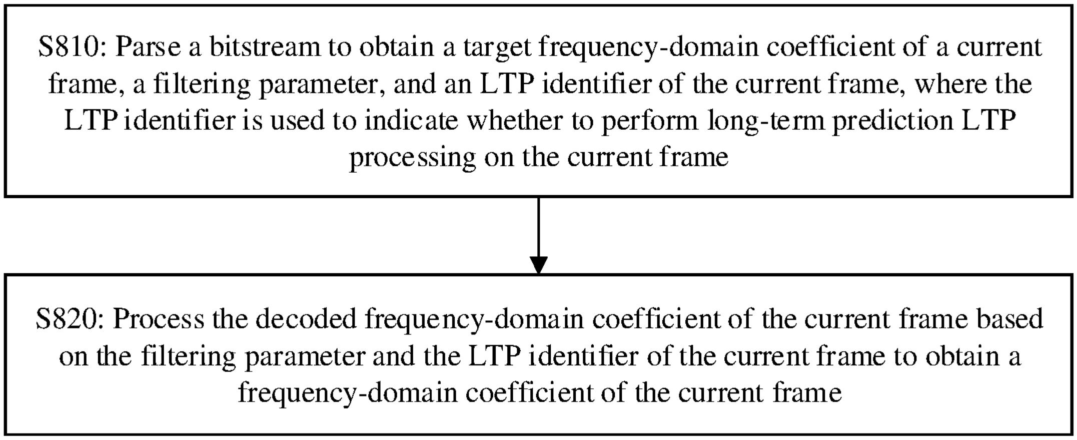
FIG. 8 is a schematic flowchart of an audio signal decoding method according to an embodiment of this application.

FIG. 8 is a schematic flowchart of an audio signal decoding method 800 according to an embodiment of this application. The method 800 may be performed by a decoder side. The decoder side may be a decoder or a device having an audio signal decoding function. The method 800 specifically includes the following steps.

S810: Parse a bitstream to obtain a decoded frequency-domain coefficient of a current frame, a filtering parameter, and an LTP identifier of the current frame, where the LTP identifier is used to indicate whether to perform long-term prediction (LTP) processing on the current frame.

The filtering parameter may be used to perform filtering processing on a frequency-domain coefficient of the current frame. The filtering processing may include temporary noise shaping (TNS) processing and/or frequency-domain noise shaping (FDNS) processing, or the filtering processing may include other processing. This is not limited in this embodiment of this application.

Optionally, in S810, the bitstream may be parsed to obtain a residual frequency-domain coefficient of the current frame.

For example, when the LTP identifier of the current frame is a first value, the decoded frequency-domain coefficient of the current frame is the residual frequency-domain coefficient of the current frame. The first value may be used to indicate to perform long-term prediction (LTP) processing on the current frame.

When the LTP identifier of the current frame is a second value, the decoded frequency-domain coefficient of the current frame is a target frequency-domain coefficient of the current frame. The second value may be used to indicate not to perform long-term prediction (LTP) processing on the current frame.

Optionally, the current frame may include a first channel and a second channel.

The first channel may be a left channel of the current frame, and the second channel may be a right channel of the current frame; or the first channel may be an M channel of a mid/side stereo signal, and the second channel may be an S channel of a mid/side stereo signal.

It should be noted that when the current frame includes the first channel and the second channel, the LTP identifier of the current frame may be used for indication in the following two manners.

Manner 1:

The LTP identifier of the current frame may be used to indicate whether to perform LTP processing on both the first channel and the second channel of the current frame.

Manner 2:

The LTP identifier of the current frame may include an LTP identifier of the first channel and an LTP identifier of the second channel. The LTP identifier of the first channel may be used to indicate whether to perform LTP processing on the first channel, and the LTP identifier of the second channel may be used to indicate whether to perform LTP processing on the second channel.

For specific description of the foregoing two manners, refer to the embodiment in FIG. 6. Details are not described herein again.

In the embodiment of the method 800, the LTP identifier of the current frame may be used for indication in Manner 1. It should be understood that the embodiment of the method 800 is merely an example rather than a limitation. The LTP identifier of the current frame in the method 800 may alternatively be used for indication in Manner 2. This is not limited in this embodiment of this application.

S820: Process the decoded frequency-domain coefficient of the current frame based on the filtering parameter and the LTP identifier of the current frame to obtain the frequency-domain coefficient of the current frame.

In S820, a process of processing the decoded frequency-domain coefficient of the current frame based on the filtering parameter and the LTP identifier of the current frame to obtain the frequency-domain coefficient of the current frame may include the following several cases:

Case 1:

Optionally, when the LTP identifier of the current frame is the first value (for example, the LTP identifier of the current frame is 1), the residual frequency-domain coefficient of the current frame and the filtering parameter may be obtained by parsing the bitstream in S810. The residual frequency-domain coefficient of the current frame may include a residual frequency-domain coefficient of the first channel and a residual frequency-domain coefficient of the second channel. The first channel may be the left channel, and the second channel may be the right channel; or the first channel may be the mid/side stereo of the M channel, and the second channel may be the mid/side stereo of the S channel.

In this case, a reference target frequency-domain coefficient of the current frame may be obtained, LTP synthesis may be performed on the reference target frequency-domain coefficient and the residual frequency-domain coefficient of the current frame to obtain the target frequency-domain coefficient of the current frame, and inverse filtering processing may be performed on the target frequency-domain coefficient of the current frame to obtain the frequency-domain coefficient of the current frame.

The inverse filtering processing may include inverse temporary noise shaping processing and/or inverse frequency-domain noise shaping processing, or the inverse filtering processing may include other processing. This is not limited in this embodiment of this application.

For example, inverse filtering processing may be performed on the target frequency-domain coefficient of the current frame based on the filtering parameter to obtain the frequency-domain coefficient of the current frame.

Specifically, the reference target frequency-domain coefficient of the current frame may be obtained by using the following method:

parsing the bitstream to obtain a pitch period of the current frame; determining a reference signal of the current frame based on the pitch period of the current frame; converting the reference signal of the current frame to obtain a reference frequency-domain coefficient of the current frame; and performing filtering processing on the reference frequency-domain coefficient based on the filtering parameter to obtain the reference target frequency-domain coefficient. The conversion performed on the reference signal of the current frame may be time to frequency domain transform, for example, MDCT transform.

Optionally, LTP synthesis may be performed on the reference target frequency-domain coefficient and the residual frequency-domain coefficient of the current frame by using the following two methods:

Method 1:

LTP synthesis may be first performed on the residual frequency-domain coefficient of the current frame to obtain an LTP-synthesized target frequency-domain coefficient of the current frame, and then stereo decoding is performed on the LTP-synthesized target frequency-domain coefficient of the current frame to obtain the target frequency-domain coefficient of the current frame.

For example, the bitstream may be parsed to obtain a stereo coding identifier of the current frame. The stereo coding identifier is used to indicate whether to perform mid/side stereo coding on the first channel and the second channel of the current frame.

Then, LTP synthesis may be performed on the residual frequency-domain coefficient of the first channel and the residual frequency-domain coefficient of the second channel based on the LTP identifier of the current frame and the stereo coding identifier of the current frame, to obtain an LTP-synthesized target frequency-domain coefficient of the first channel and an LTP-synthesized target frequency-domain coefficient of the second channel.

Specifically, when the stereo coding identifier is a first value, stereo decoding may be performed on the reference target frequency-domain coefficient to obtain an updated reference target frequency-domain coefficient; and LTP synthesis may be performed on a target frequency-domain coefficient of the first channel, a target frequency-domain coefficient of the second channel, and the updated reference target frequency-domain coefficient to obtain the LTP-synthesized target frequency-domain coefficient of the first channel and the LTP-synthesized target frequency-domain coefficient of the second channel.

Alternatively, when the stereo coding identifier is a second value, LTP synthesis may be performed on a target frequency-domain coefficient of the first channel, a target frequency-domain coefficient of the second channel, and the reference target frequency-domain coefficient to obtain an LTP-synthesized target frequency-domain coefficient of the first channel and an LTP-synthesized target frequency-domain coefficient of the second channel.

Then stereo decoding may be performed on the LTP-synthesized target frequency-domain coefficient of the first channel and the LTP-synthesized target frequency-domain coefficient of the second channel based on the stereo coding identifier to obtain the target frequency-domain coefficient of the first channel and the target frequency-domain coefficient of the second channel.

Method 2:

Stereo decoding may be first performed on the residual frequency-domain coefficient of the current frame to obtain a decoded residual frequency-domain coefficient of the current frame, and then LTP synthesis may be performed on the decoded residual frequency-domain coefficient of the current frame to obtain the target frequency-domain coefficient of the current frame.

For example, the bitstream may be parsed to obtain a stereo coding identifier of the current frame. The stereo coding identifier is used to indicate whether to perform mid/side stereo coding on the first channel and the second channel of the current frame.

Then, stereo decoding may be performed on the residual frequency-domain coefficient of the first channel and the residual frequency-domain coefficient of the second channel based on the stereo coding identifier to obtain a decoded residual frequency-domain coefficient of the first channel and a decoded residual frequency-domain coefficient of the second channel.

Then, LTP synthesis may be performed on the decoded residual frequency-domain coefficient of the first channel and the decoded residual frequency-domain coefficient of the second channel based on the LTP identifier of the current frame and the stereo coding identifier to obtain a target frequency-domain coefficient of the first channel and a target frequency-domain coefficient of the second channel.

Specifically, when the stereo coding identifier is a first value, stereo decoding may be performed on the reference target frequency-domain coefficient to obtain a decoded reference target frequency-domain coefficient; and LTP synthesis is performed on the decoded residual frequency-domain coefficient of the first channel, the decoded residual frequency-domain coefficient of the second channel, and the decoded reference target frequency-domain coefficient, to obtain the target frequency-domain coefficient of the first channel and the target frequency-domain coefficient of the second channel.

Alternatively, when the stereo coding identifier is a second value, LTP synthesis may be performed on the decoded residual frequency-domain coefficient of the first channel, the decoded residual frequency-domain coefficient of the second channel, and the reference target frequency-domain coefficient, to obtain the target frequency-domain coefficient of the first channel and the target frequency-domain coefficient of the second channel.

In the foregoing Method 1 and Method 2, when the stereo coding identifier is 0, the stereo coding identifier is used to indicate not to perform mid/side stereo encoding on the current frame. In this case, the first channel may be the left channel of the current frame, and the second channel may be the right channel of the current frame. When the stereo coding identifier is 1, the stereo coding identifier is used to indicate to perform mid/side stereo encoding on the current frame. In this case, the first channel may be the mid/side stereo of the M channel, and the second channel may be the mid/side stereo of the S channel.

After the target frequency-domain coefficient (that is, the target frequency-domain coefficient of the first channel and the target frequency-domain coefficient of the second channel) of the current frame is obtained in the foregoing two manners, inverse filtering processing is performed on the target frequency-domain coefficient of the current frame to obtain the frequency-domain coefficient of the current frame.

Case 2:

Optionally, when the LTP identifier of the current frame is the second value (for example, the second value is 0), inverse filtering processing may be performed on the target frequency-domain coefficient of the current frame to obtain the frequency-domain coefficient of the current frame.

Optionally, when the LTP identifier of the current frame is the second value (for example, the second value is 0), the bitstream may be parsed to obtain an intensity level difference (ILD) between the first channel and the second channel; and energy of the first channel or energy of the second channel may be adjusted based on the ILD.

It should be noted that when the LTP identifier of the current frame is the first value, there is no need to calculate the intensity level difference (ILD) between the first channel and the second channel. In this case, there is no need to adjust the energy of the first channel or the energy of the second channel (based on the ILD), either.

Figure 9:
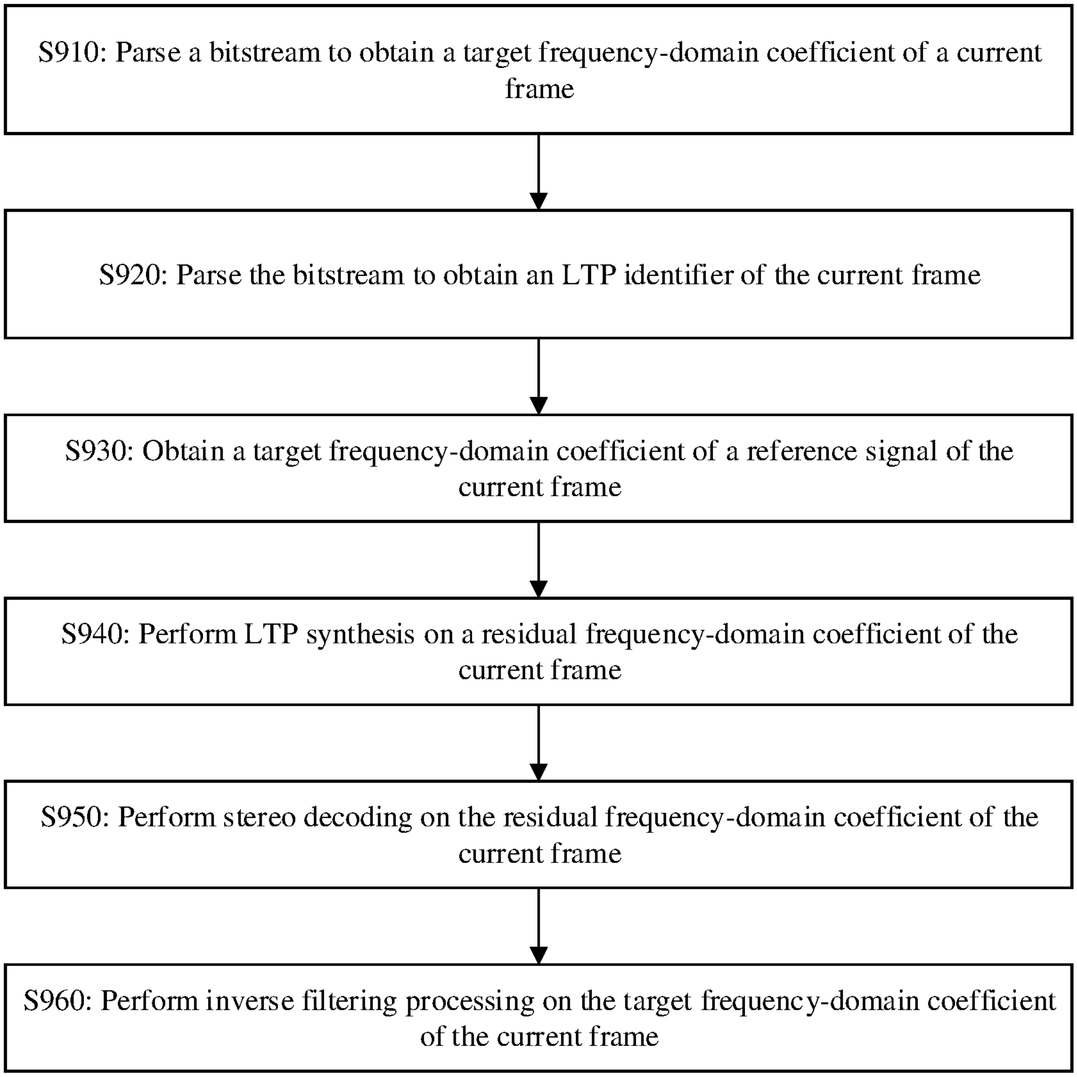
FIG. 9 is a schematic flowchart of an audio signal decoding method according to another embodiment of this application.

With reference to FIG. 9, the following describes a detailed process of an audio signal decoding method in an embodiment of this application by using a stereo signal (that is, a current frame includes a left channel signal and a right channel signal) as an example.

It should be understood that the embodiment shown in FIG. 9 is merely an example rather than a limitation. An audio signal in this embodiment may alternatively be a mono signal or a multi-channel signal. This is not limited in this embodiment of this application.

FIG. 9 is a schematic flowchart of the audio signal decoding method according to this embodiment. The method 900 may be performed by a decoder side. The decoder side may be a decoder or a device having an audio signal decoding function. The method 900 specifically includes the following steps.

S910: Parse a bitstream to obtain a target frequency-domain coefficient of a current frame.

Optionally, a transform coefficient may be further obtained by parsing the bitstream.

The filtering parameter may be used to perform filtering processing on a frequency-domain coefficient of the current frame. The filtering processing may include temporary noise shaping (TNS) processing and/or frequency-domain noise shaping (FDNS) processing, or the filtering processing may include other processing. This is not limited in this embodiment of this application.

Optionally, in S910, the bitstream may be parsed to obtain a residual frequency-domain coefficient of the current frame.

For a specific bitstream parsing method, refer to a conventional technology. Details are not described herein.

S920: Parse the bitstream to obtain an LTP identifier of the current frame.

The LTP identifier may be used to indicate whether to perform long-term prediction (LTP) processing on the current frame.

For example, when the LTP identifier is a first value, the bitstream is parsed to obtain the residual frequency-domain coefficient of the current frame. The first value may be used to indicate to perform long-term prediction (LTP) processing on the current frame.

When the LTP identifier is a second value, the bitstream is parsed to obtain the target frequency-domain coefficient of the current frame. The second value may be used to indicate not to perform long-term prediction (LTP) processing on the current frame.

For example, when the LTP identifier indicates to perform long-term prediction (LTP) processing on the current frame, in the foregoing S910, the bitstream may be parsed to obtain the residual frequency-domain coefficient of the current frame; or when the LTP identifier indicates not to perform long-term prediction (LTP) processing on the current frame, in the foregoing S910, the bitstream may be parsed to obtain the target frequency-domain coefficient of the current frame.

The following provides description by using an example of a case in which the bitstream is parsed to obtain the residual frequency-domain coefficient of the current frame in S910. For subsequent processing of the case in which the bitstream is parsed to obtain the target frequency-domain coefficient of the current frame, refer to the conventional technology. Details are not described herein again.

It should be noted that when the current frame includes the left channel signal and the right channel signal, the LTP identifier of the current frame may be used for indication in the following two manners.

Manner 1:

The LTP identifier of the current frame may be used to indicate whether to perform LTP processing on both the left channel signal and the right channel signal of the current frame.

The LTP identifier may further include the first identifier and/or the second identifier described in the embodiment of the method 600 in FIG. 6.

For example, the LTP identifier may include the first identifier and the second identifier. The first identifier may be used to indicate whether to perform LTP processing on the current frame, and the second identifier may be used to indicate a frequency band on which LTP processing is to be performed and that is of the current frame.

For another example, the LTP identifier may be the first identifier. The first identifier may be used to indicate whether to perform LTP processing on the current frame. In addition, when LTP processing is performed on the current frame, the first identifier may further indicate a frequency band (for example, a high frequency band, a low frequency band, or a full frequency band of the current frame) on which LTP processing is performed and that is of the current frame.

Manner 2:

The LTP identifier of the current frame may include an LTP identifier of a left channel and an LTP identifier of a right channel. The LTP identifier of the left channel may be used to indicate whether to perform LTP processing on the left channel signal, and the LTP identifier of the right channel may be used to indicate whether to perform LTP processing on the right channel signal.

Further, as described in the embodiment of the method 600 in FIG. 6, the LTP identifier of the left channel may include a first identifier of the left channel and/or a second identifier of the left channel, and the LTP identifier of the right channel may include a first identifier of the right channel and/or a second identifier of the right channel.

The following provides description by using the LTP identifier of the left channel as an example. The LTP identifier of the right channel is similar to the LTP identifier of the left channel. Details are not described herein.

For example, the LTP identifier of the left channel may include the first identifier of the left channel and the second identifier of the left channel. The first identifier of the left channel may be used to indicate whether to perform LTP processing on the left channel, and the second identifier may be used to indicate a frequency band on which LTP processing is performed and that is of the left channel.

For another example, the LTP identifier of the left channel may be the first identifier of the left channel. The first identifier of the left channel may be used to indicate whether to perform LTP processing on the left channel. In addition, when LTP processing is performed on the left channel, the first identifier of the left channel may further indicate a frequency band (for example, a high frequency band, a low frequency band, or a full frequency band of the left channel) on which LTP processing is performed and that is of the left channel.

For specific description of the first identifier and the second identifier in the foregoing two manners, refer to the embodiment in FIG. 6. Details are not described herein again.

In the embodiment of the method 900, the LTP identifier of the current frame may be used for indication in Manner 1. It should be understood that the embodiment of the method 900 is merely an example rather than a limitation. The LTP identifier of the current frame in the method 900 may alternatively be used for indication in Manner 2. This is not limited in this embodiment of this application.

S930: Obtain a reference target frequency-domain coefficient of the current frame.

Specifically, the reference target frequency-domain coefficient of the current frame may be obtained by using the following method:

parsing the bitstream to obtain a pitch period of the current frame; determining a reference signal of the current frame based on the pitch period of the current frame; converting the reference signal of the current frame to obtain a reference frequency-domain coefficient of the current frame; and performing filtering processing on the reference frequency-domain coefficient based on the filtering parameter to obtain the reference target frequency-domain coefficient. The conversion performed on the reference signal of the current frame may be time-to-frequency domain transform, for example, MDCT transform.

For example, the bitstream may be parsed to obtain the pitch period of the current frame, and a reference signal ref[j] of the current frame may be obtained from a history buffer based on the pitch period. Any pitch period searching method may be used to search the pitch periods. This is not limited in this embodiment of this application.

$$\mathrm{ref}[j]=syn[L-N-K+j], j=0,1,\ldots,N-1$$

A history buffer signal syn stores a decoded time-domain signal obtained through inverse MDCT transform, a length satisfies L=2N, N represents a frame length, and K represents a pitch period.

For the history buffer signal syn, an arithmetic-coded residual signal is decoded, LTP synthesis is performed, inverse TNS processing and inverse FDNS processing are performed based on the TNS parameter and the FDNS parameter that are obtained in S710, inverse MDCT transform is then performed to obtain a synthesized time-domain signal. The synthesized time-domain signal is stored in the history buffer. Inverse TNS processing is an inverse operation of TNS processing (filtering), to obtain a signal that has not undergone TNS processing. Inverse FDNS processing is an inverse operation of FDNS processing (filtering), to obtain a signal that has not undergone FDNS processing. For specific methods for performing inverse TNS processing and inverse FDNS processing, refer to the conventional technology. Details are not described herein.

Optionally, MDCT transform is performed on the reference signal ref[j], and filtering processing is performed on a frequency-domain coefficient of the reference signal ref[j] based on the filtering parameter obtained in S910, to obtain a target frequency-domain coefficient of the reference signal ref[j].

First, TNS processing may be performed on an MDCT coefficient (that is, the reference frequency-domain coefficient) of a reference signal ref[j] by using a TNS identifier and the TNS parameter, to obtain a TNS-processed reference frequency-domain coefficient.

For example, when the TNS identifier is 1, TNS processing is performed on the MDCT coefficient of the reference signal based on the TNS parameter.

Then, FDNS processing may be performed on the TNS-processed reference frequency-domain coefficient by using the FDNS parameter, to obtain an FDNS-processed reference frequency-domain coefficient, that is, the reference target frequency-domain coefficient $X_{ref}[k]$.

It should be noted that an order of performing TNS processing and FDNS processing is not limited in this embodiment of this application. For example, alternatively, FDNS processing may be performed on the reference frequency-domain coefficient (that is, the MDCT coefficient of the reference signal) before TNS processing. This is not limited in this embodiment of this application.

Particularly, when the current frame includes the left channel signal and the right channel signal, the reference target frequency-domain coefficient $X_{ref}[k]$ includes a reference target frequency-domain coefficient $X_{refL}[k]$ of the left channel and a reference target frequency-domain coefficient $X_{refR}[k]$ of the right channel.

In FIG. 9, the following describes a detailed process of the audio signal decoding method in this embodiment by using an example in which the current frame includes the left channel signal and the right channel signal. It should be understood that the embodiment shown in FIG. 9 is merely an example rather than a limitation.

S940: Perform LTP synthesis on the residual frequency-domain coefficient of the current frame.

Optionally, the bitstream may be parsed to obtain a stereo coding identifier stereoMode.

Based on different stereo coding identifiers stereoMode, there may be the following two cases:

Case 1:

If the stereo coding identifier stereoMode is 0, the target frequency-domain coefficient of the current frame obtained by parsing the bitstream in S910 is the residual frequency-domain coefficient of the current frame. For example, a residual frequency-domain coefficient of the left channel signal may be expressed as $X_L[k]$, and a residual frequency-domain coefficient of the right channel signal may be expressed as $X_R[k]$.

In this case, LTP synthesis may be performed on the residual frequency-domain coefficient $X_L[k]$ of the left channel signal and the residual frequency-domain coefficient $X_R[k]$ of the right channel signal.

For example, LTP synthesis may be performed based on the following formula:

$$X_L[k]={}_L[k]+g_{Li}*X_{refL}[k]$$

$$X_R[k]=X_R[k]+g_{Ri}*X_{refL}[k]$$

$X_L[k]$ on the left of the formula represents an LTP-synthesized target frequency-domain coefficient of the left channel, $X_L[k]$ on the right of the formula represents a residual frequency-domain coefficient of the left channel signal, $X_R[k]$ on the left of the formula represents an LTP-synthesized target frequency-domain coefficient of the right channel, $X_R[k]$ on the right of the formula represents a residual frequency-domain coefficient of the right channel signal, $X_{refL}$ represents the reference target frequency-domain coefficient of the left channel, $X_{refR}$ represents the reference target frequency-domain coefficient of the right channel, $g_{Li}$ represents an LTP-predicted gain of an $i^{th}$ subframe of the left channel, $g_{Ri}$ represents an LTP-predicted gain of an $i^{th}$ subframe of the right channel, M represents a quantity of MDCT coefficients participating in LTP processing, i and k are positive integers, and $0 \le k \le M$.

Case 2:

If the stereo coding identifier stereoMode is 1, the target frequency-domain coefficient of the current frame obtained by parsing the bitstream in $910 is residual frequency-domain coefficients of mid/side stereo signals of the current frame. For example, the residual frequency-domain coefficients of the mid/side stereo signals of the current frame may be expressed as $X_M[k]$ and $X_S[k]$.

In this case, LTP synthesis may be performed on the residual frequency-domain coefficients $X_M[k]$ and $X_S[k]$ of the mid/side stereo signals of the current frame.

For example, LTP synthesis may be performed based on the following formula:

$$X_M[k]=X_M[k]+g_{Mi}*X_{refM}[k]$$

$$X_S[k]=X_S[k]+g_{Si}*X_{refS}[k]$$

$X_M[k]$ on the left of the formula represents an M channel of an LTP-synthesized mid/side stereo signal of the current frame, $X_M[k]$ on the right of the formula represents a residual frequency-domain coefficient of the M channel of the current frame, $X_S[k]$ on the left of the formula represents an S channel of an LTP-synthesized mid/side stereo signal of the current frame, $X_S[k]$ on the right of the formula represents a residual frequency-domain coefficient of the S channel of the current frame, $g_{Mi}$ represents an LTP-predicted gain of an $i^{th}$ subframe of the M channel, $g_{si}$ represents an LTP-predicted gain of an $i^{th}$ subframe of the S channel, M represents a quantity of MDCT coefficients participating in LTP processing, i and k are positive integers, $0 \le k \le M$, and $X_{refM}$ and $X_{refS}$ represent reference signals obtained through mid/side stereo processing. Details are as follows:

$$X_{refM}[k]=(X_{reL}[k]+X_{refR}[k])*\sqrt{2}/2$$

$$X_{refS}[k]=(X_{refL}[k]-X_{refR}[k])*\sqrt{2}/2$$

It should be noted that, in this embodiment, stereo decoding may be further performed on the residual frequency-domain coefficient of the current frame, and then LTP synthesis may be performed on the residual frequency-domain coefficient of the current frame. That is, S950 is performed before S940.

S950: Perform stereo decoding on the residual frequency-domain coefficient of the current frame.

Optionally, if the stereo coding identifier stereoMode is 1, the target frequency-domain coefficient $X_L[k]$ and $X_R[k]$ of the left channel and the right channel may be determined by using the following formulas:

$$X_L[k]=(X_M[k]+X_S[k])*\sqrt{2}/2$$

$$X_R[k]=(X_M[k]-X_S[k])*\sqrt{2}/2$$

$X_M[k]$ represents the LTP-synthesized mid/side stereo signal of the M channel of the current frame, and $X_S[k]$ represents the LTP-synthesized mid/side stereo signal of the S channel of the current frame.

Further, if an LTP identifier enableRALTP of the current frame is 0, the bitstream may be parsed to obtain an intensity level difference (ILD) between the left channel of the current frame and the right channel of the current frame, a ratio nrgRatio of energy of the left channel signal to energy of the right channel signal may be obtained, and an MDCT parameter of the left channel and an MDCT parameter of the right channel (that is, a target frequency-domain coefficient of the left channel and a target frequency-domain coefficient of the right channel) may be updated.

For example, if nrgRatio is less than 1.0, the MDCT coefficient of the left channel is adjusted based on the following formula:

$$X_{refL}[k]=\frac{X_L[k]}{nrg\text{Ratio}}$$

$X_{refL}[k]$ on the left of the formula represents an adjusted MDCT coefficient of the left channel, and $X_L[k]$ on the right of the formula represents the unadjusted MDCT coefficient of the left channel.

If the ratio nrgRatio is greater than 1.0, an MDCT coefficient of the right channel is adjusted based on the following formula:

$$X_{refR}[k]=\frac{X_R[k]}{nrg\text{Ratio}}$$

$X_{refR}[k]$ on the left of the formula represents an adjusted MDCT coefficient of the right channel, and $X_R[k]$ on the right of the formula represents the unadjusted MDCT coefficient of the right channel.

If the LTP identifier enableRALTP of the current frame is 1, the MDCT parameter $X_L[k]$ of the left channel and the MDCT parameter $X_R[k]$ of the right channel are not adjusted.

S960: Perform inverse filtering processing on the target frequency-domain coefficient of the current frame.

Inverse filtering processing is performed on the target frequency-domain coefficient of the current frame to obtain the frequency-domain coefficient of the current frame.

For example, inverse FDNS processing and inverse TNS processing may be performed on the MDCT parameter $X_L[k]$ of the left channel and the MDCT parameter $X_R[k]$ of the right channel to obtain the frequency-domain coefficient of the current frame.

Then, an inverse MDCT operation is performed on the frequency-domain coefficient of the current frame to obtain a synthesized time-domain signal of the current frame.

The foregoing describes in detail the audio signal encoding method and the audio signal decoding method in embodiments of this application with reference to FIG. 1 to FIG. 9. The following describes an audio signal encoding apparatus and an audio signal decoding apparatus in embodiments of this application with reference to FIG. 10 to FIG. 13. It should be understood that the encoding apparatus in FIG. 10 to FIG. 13 corresponds to the audio signal encoding method in embodiments of this application, and the encoding apparatus may perform the audio signal encoding method in embodiments of this application. The decoding apparatus in FIG. 10 to FIG. 13 corresponds to the audio signal decoding method in embodiments of this application, and the decoding apparatus may perform the audio signal decoding method in embodiments of this application. For brevity, repeated descriptions are appropriately omitted below.

Figure 10:
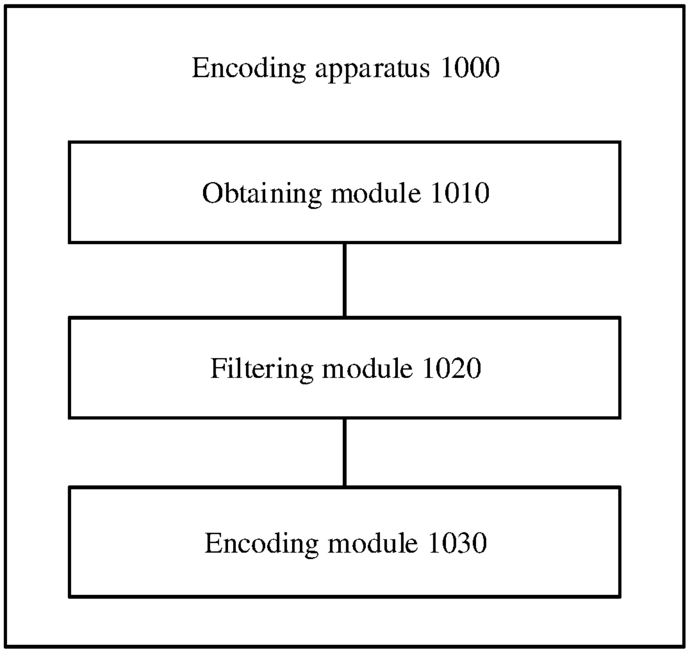
FIG. 10 is a schematic block diagram of an encoding apparatus according to an embodiment of this application.

FIG. 10 is a schematic block diagram of an encoding apparatus according to an embodiment of this application. The encoding apparatus 1000 shown in FIG. 10 includes:

- an obtaining module 1010, configured to obtain a frequency-domain coefficient of a current frame and a reference frequency-domain coefficient of the current frame;
- a filtering module 1020, configured to perform filtering processing on the frequency-domain coefficient of the current frame to obtain a filtering parameter, where
- the filtering module 1020 is further configured to determine a target frequency-domain coefficient of the current frame based on the filtering parameter; and
- the filtering module 1020 is further configured to perform the filtering processing on the reference frequency-domain coefficient based on the filtering parameter to obtain the reference target frequency-domain coefficient; and
- an encoding module 1030, configured to encode the target frequency-domain coefficient of the current frame based on the reference target frequency-domain coefficient.

Optionally, the filtering parameter is used to perform filtering processing on the frequency-domain coefficient of the current frame, and the filtering processing includes temporary noise shaping processing and/or frequency-domain noise shaping processing.

Optionally, the encoding module is specifically configured to: perform long-term prediction (LTP) determining based on the target frequency-domain coefficient and the reference target frequency-domain coefficient of the current frame, to obtain a value of an LTP identifier of the current frame, where the LTP identifier is used to indicate whether to perform LTP processing on the current frame; encode the target frequency-domain coefficient of the current frame based on the value of the LTP identifier of the current frame; and write the value of the LTP identifier of the current frame into a bitstream.

Optionally, the encoding module is specifically configured to: when the LTP identifier of the current frame is a first value, perform LTP processing on the target frequency-domain coefficient and the reference target frequency-domain coefficient of the current frame to obtain a residual frequency-domain coefficient of the current frame; and encode the residual frequency-domain coefficient of the current frame; or when the LTP identifier of the current frame is a second value, encode the target frequency-domain coefficient of the current frame.

Optionally, the current frame includes a first channel and a second channel, and the LTP identifier of the current frame is used to indicate whether to perform LTP processing on both the first channel and the second channel of the current frame; or the LTP identifier of the current frame includes an LTP identifier of a first channel and an LTP identifier of a second channel, where the LTP identifier of the first channel is used to indicate whether to perform LTP processing on the first channel, and the LTP identifier of the second channel is used to indicate whether to perform LTP processing on the second channel.

Optionally, when the LTP identifier of the current frame is the first value, the encoding module is specifically configured to: perform stereo determining on a target frequency-domain coefficient of the first channel and a target frequency-domain coefficient of the second channel to obtain a stereo coding identifier of the current frame, where the stereo coding identifier is used to indicate whether to perform stereo encoding on the current frame; perform LTP processing on the target frequency-domain coefficient of the first channel, the target frequency-domain coefficient of the second channel, and the reference target frequency-domain coefficient based on the stereo coding identifier of the current frame, to obtain a residual frequency-domain coefficient of the first channel and a residual frequency-domain coefficient of the second channel; and encode the residual frequency-domain coefficient of the first channel and the residual frequency-domain coefficient of the second channel.

Optionally, the encoding module is specifically configured to: when the stereo coding identifier is a first value, perform stereo encoding on the reference target frequency-domain coefficient to obtain an encoded reference target frequency-domain coefficient; and perform LTP processing on the target frequency-domain coefficient of the first channel, the target frequency-domain coefficient of the second channel, and the encoded reference target frequency-domain coefficient to obtain the residual frequency-domain coefficient of the first channel and the residual frequency-domain coefficient of the second channel; or when the stereo coding identifier is a second value, perform LTP processing on the target frequency-domain coefficient of the first channel, the target frequency-domain coefficient of the second channel, and the reference target frequency-domain coefficient to obtain the residual frequency-domain coefficient of the first channel and the residual frequency-domain coefficient of the second channel.

Optionally, when the LTP identifier of the current frame is the first value, the encoding module is specifically configured to: perform LTP processing on a target frequency-domain coefficient of the first channel and a target frequency-domain coefficient of the second channel based on the LTP identifier of the current frame to obtain a residual frequency-domain coefficient of the first channel and a residual frequency-domain coefficient of the second channel; perform stereo determining on the residual frequency-domain coefficient of the first channel and the residual frequency-domain coefficient of the second channel to obtain a stereo coding identifier of the current frame, where the stereo coding identifier is used to indicate whether to perform stereo encoding on the current frame; and encode the residual frequency-domain coefficient of the first channel and the residual frequency-domain coefficient of the second channel based on the stereo coding identifier of the current frame.

Optionally, the encoding module is specifically configured to: when the stereo coding identifier is a first value, perform stereo encoding on the reference target frequency-domain coefficient to obtain an encoded reference target frequency-domain coefficient; perform update processing on the residual frequency-domain coefficient of the first channel and the residual frequency-domain coefficient of the second channel based on the encoded reference target frequency-domain coefficient to obtain an updated residual frequency-domain coefficient of the first channel and an updated residual frequency-domain coefficient of the second channel; and encode the updated residual frequency-domain coefficient of the first channel and the updated residual frequency-domain coefficient of the second channel; or when the stereo coding identifier is a second value, encode the residual frequency-domain coefficient of the first channel and the residual frequency-domain coefficient of the second channel.

Optionally, the encoding apparatus further includes an adjustment module. The adjustment module is configured to: when the LTP identifier of the current frame is the second value, calculate an intensity level difference (ILD) between the first channel and the second channel; and adjust energy of the first channel or energy of the second channel signal based on the ILD.

Figure 11:
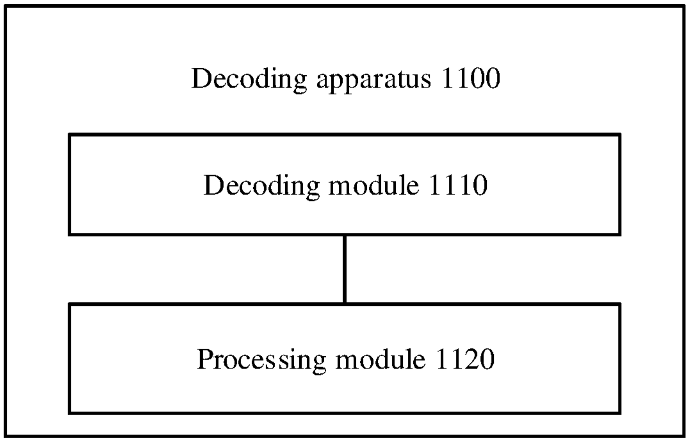
FIG. 11 is a schematic block diagram of a decoding apparatus according to an embodiment of this application.

FIG. 11 is a schematic block diagram of a decoding apparatus according to an embodiment of this application. The decoding apparatus 1100 shown in FIG. 11 includes:

- a decoding module 1110, configured to parse a bitstream to obtain a decoded frequency-domain coefficient of a current frame, a filtering parameter, and an LTP identifier of the current frame, where the LTP identifier is used to indicate whether to perform long-term prediction (LTP) processing on the current frame; and
- a processing module 1120, configured to process the decoded frequency-domain coefficient of the current frame based on the filtering parameter and the LTP identifier of the current frame to obtain a frequency-domain coefficient of the current frame.

Optionally, the filtering parameter is used to perform filtering processing on the frequency-domain coefficient of the current frame, and the filtering processing includes temporary noise shaping processing and/or frequency-domain noise shaping processing.

Optionally, the current frame includes a first channel and a second channel, and the LTP identifier of the current frame is used to indicate whether to perform LTP processing on both the first channel and the second channel of the current frame; or the LTP identifier of the current frame includes an LTP identifier of a first channel and an LTP identifier of a second channel, where the LTP identifier of the first channel is used to indicate whether to perform LTP processing on the first channel, and the LTP identifier of the second channel is used to indicate whether to perform LTP processing on the second channel.

Optionally, when the LTP identifier of the current frame is a first value, the decoded frequency-domain coefficient of the current frame is a residual frequency-domain coefficient of the current frame. The processing module is specifically configured to: when the LTP identifier of the current frame is the first value, obtain a reference target frequency-domain coefficient of the current frame; perform LTP synthesis on the reference target frequency-domain coefficient and the residual frequency-domain coefficient of the current frame to obtain a target frequency-domain coefficient of the current frame; and perform inverse filtering processing on the target frequency-domain coefficient of the current frame to obtain the frequency-domain coefficient of the current frame.

Optionally, the processing module is specifically configured to: parse the bitstream to obtain a pitch period of the current frame; determine a reference frequency-domain coefficient of the current frame based on the pitch period of the current frame; and perform filtering processing on the reference frequency-domain coefficient based on the filtering parameter to obtain the reference target frequency-domain coefficient.

Optionally, when the LTP identifier of the current frame is a second value, the decoded frequency-domain coefficient of the current frame is a target frequency-domain coefficient of the current frame. The processing module is specifically configured to: when the LTP identifier of the current frame is the second value, perform inverse filtering processing on the target frequency-domain coefficient of the current frame to obtain the frequency-domain coefficient of the current frame.

Optionally, the inverse filtering processing includes inverse temporary noise shaping processing and/or inverse frequency-domain noise shaping processing.

Optionally, the decoding module is further configured to parse the bitstream to obtain a stereo coding identifier of the current frame, where the stereo coding identifier is used to indicate whether to perform stereo coding on the current frame. The processing module is specifically configured to: perform LTP synthesis on the residual frequency-domain coefficient of the current frame and the reference target frequency-domain coefficient based on the stereo coding identifier to obtain an LTP-synthesized target frequency-domain coefficient of the current frame; and perform stereo decoding on the LTP-synthesized target frequency-domain coefficient of the current frame based on the stereo coding identifier to obtain the target frequency-domain coefficient of the current frame.

Optionally, the processing module is specifically configured to: when the stereo coding identifier is a first value, perform stereo decoding on the reference target frequency-domain coefficient to obtain a decoded reference target frequency-domain coefficient, where the first value is used to indicate to perform stereo coding on the current frame; and perform LTP synthesis on a residual frequency-domain coefficient of the first channel, a residual frequency-domain coefficient of the second channel, and the decoded reference target frequency-domain coefficient to obtain an LTP-synthesized target frequency-domain coefficient of the first channel and an LTP-synthesized target frequency-domain coefficient of the second channel; or when the stereo coding identifier is a second value, perform LTP processing on a residual frequency-domain coefficient of the first channel, a residual frequency-domain coefficient of the second channel, and the reference target frequency-domain coefficient to obtain an LTP-synthesized target frequency-domain coefficient of the first channel and an LTP-synthesized target frequency-domain coefficient of the second channel, where the second value is used to indicate not to perform stereo coding on the current frame.

Optionally, the decoding module is further configured to parse the bitstream to obtain a stereo coding identifier of the current frame, where the stereo coding identifier is used to indicate whether to perform stereo coding on the current frame. The processing module is specifically configured to: perform stereo decoding on the residual frequency-domain coefficient of the current frame based on the stereo coding identifier to obtain a decoded residual frequency-domain coefficient of the current frame; and perform LTP synthesis on the decoded residual frequency-domain coefficient of the current frame based on the LTP identifier of the current frame and the stereo coding identifier to obtain the target frequency-domain coefficient of the current frame.

Optionally, the processing module is specifically configured to: when the stereo coding identifier is a first value, perform stereo decoding on the reference target frequency-domain coefficient to obtain a decoded reference target frequency-domain coefficient, where the first value is used to indicate to perform stereo coding on the current frame; and perform LTP synthesis on a decoded residual frequency-domain coefficient of the first channel, a decoded residual frequency-domain coefficient of the second channel, and the decoded reference target frequency-domain coefficient to obtain a target frequency-domain coefficient of the first channel and a target frequency-domain coefficient of the second channel; or when the stereo coding identifier is a second value, perform LTP synthesis on a decoded residual frequency-domain coefficient of the first channel, a decoded residual frequency-domain coefficient of the second channel, and the reference target frequency-domain coefficient to obtain a target frequency-domain coefficient of the first channel and a target frequency-domain coefficient of the second channel, where the second value is used to indicate not to perform stereo coding on the current frame.

Optionally, the decoding apparatus further includes an adjustment module. The adjustment module is configured to: when the LTP identifier of the current frame is the second value, parse the bitstream to obtain an intensity level difference (ILD) between the first channel and the second channel; and adjust energy of the first channel or energy of the second channel based on the ILD.

Figure 12:
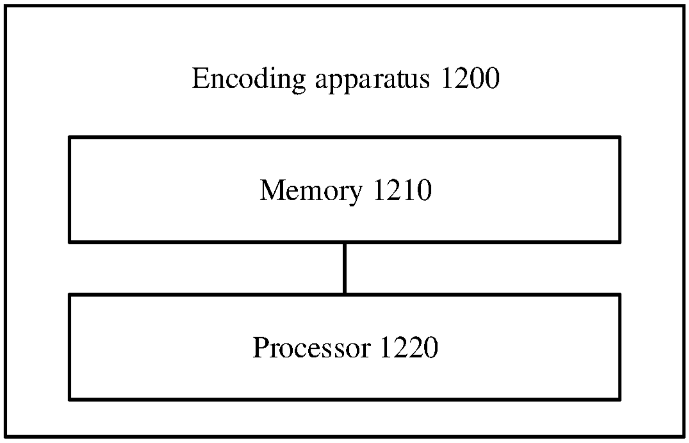
FIG. 12 is a schematic block diagram of an encoding apparatus according to an embodiment of this application.

FIG. 12 is a schematic block diagram of an encoding apparatus according to an embodiment of this application. The encoding apparatus 1200 shown in FIG. 12 includes:

- a memory 1210, configured to store a program; and
- a processor 1220, configured to execute the program stored in the memory 1210. When the program in the memory 1210 is executed, the processor 1220 is specifically configured to: obtain a frequency-domain coefficient of a current frame and a reference frequency-domain coefficient of the current frame; perform filtering processing on the frequency-domain coefficient of the current frame to obtain a filtering parameter; determine a target frequency-domain coefficient of the current frame based on the filtering parameter; perform the filtering processing on the reference frequency-domain coefficient based on the filtering parameter to obtain the reference target frequency-domain coefficient; and encode the target frequency-domain coefficient of the current frame based on the reference target frequency-domain coefficient.

Figure 13:
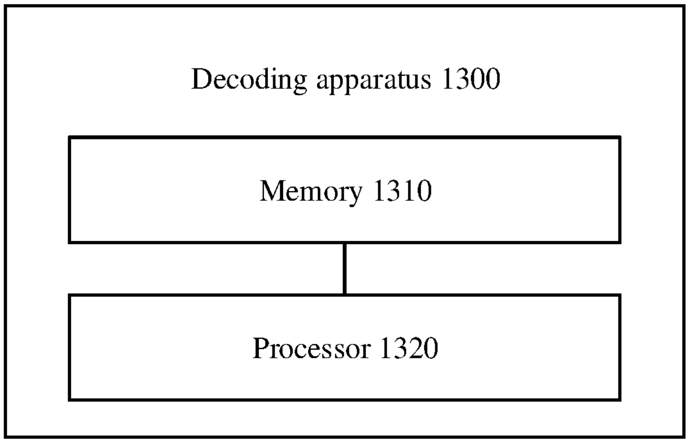
FIG. 13 is a schematic block diagram of a decoding apparatus according to an embodiment of this application.

FIG. 13 is a schematic block diagram of a decoding apparatus according to an embodiment of this application. The decoding apparatus 1300 shown in FIG. 13 includes:

- a memory 1310, configured to store a program; and
- a processor 1320, configured to execute the program stored in the memory 1310. When the program in the memory 1310 is executed, the processor 1320 is specifically configured to: parse a bitstream to obtain a decoded frequency-domain coefficient of a current frame, a filtering parameter, and an LTP identifier of the current frame, where the LTP identifier is used to indicate whether to perform long-term prediction (LTP) processing on the current frame; and process the decoded frequency-domain coefficient of the current frame based on the filtering parameter and the LTP identifier of the current frame to obtain a frequency-domain coefficient of the current frame.

Figure 14:
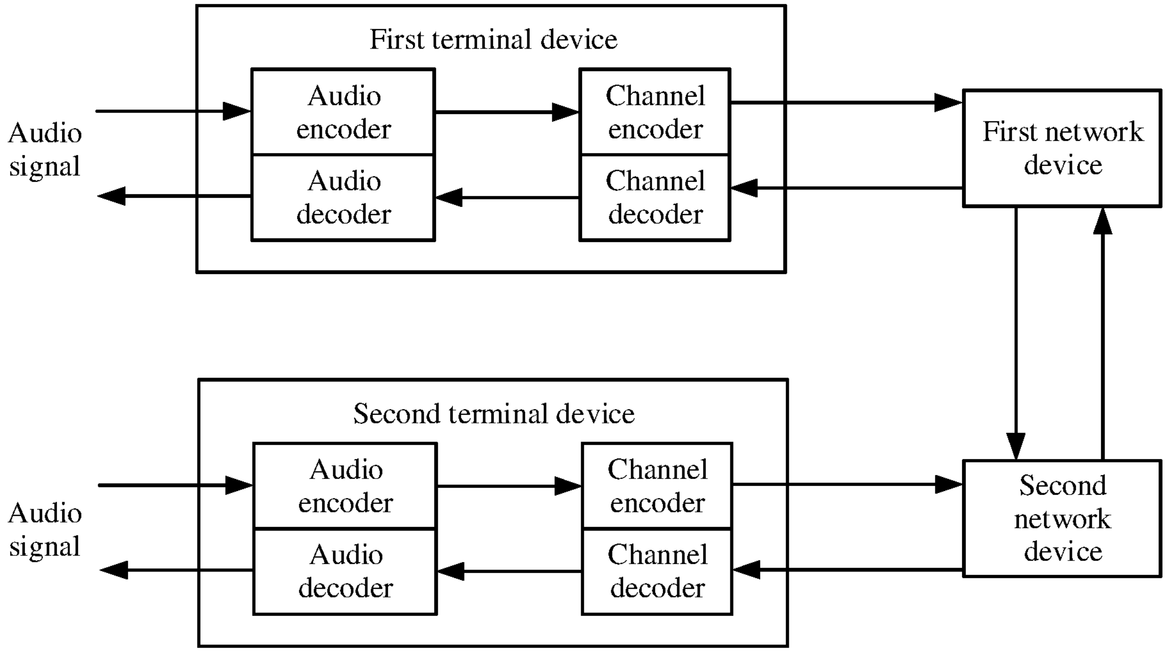
FIG. 14 is a schematic diagram of a terminal device according to an embodiment of this application.
Figure 15:
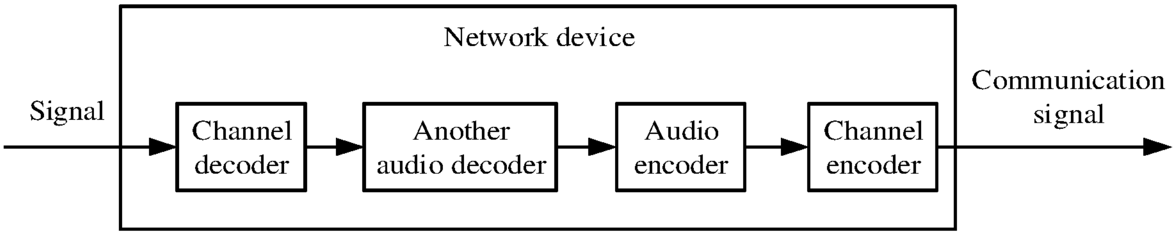
FIG. 15 is a schematic diagram of a network device according to an embodiment of this application.
Figure 16:
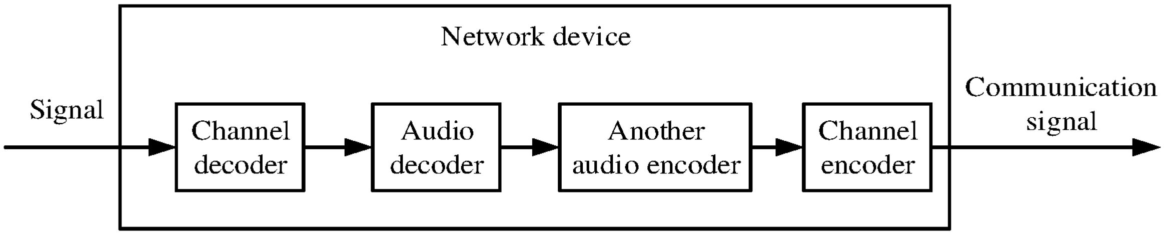
FIG. 16 is a schematic diagram of a network device according to an embodiment of this application.

It should be understood that the audio signal encoding method and the audio signal decoding method in embodiments of this application may be performed by a terminal device or a network device in FIG. 14 to FIG. 16. In addition, the encoding apparatus and the decoding apparatus in embodiments of this application may alternatively be disposed in the terminal device or the network device in FIG. 14 to FIG. 16. Specifically, the encoding apparatus in embodiments of this application may be an audio signal encoder in the terminal device or the network device in FIG. 14 to FIG. 16, and the decoding apparatus in embodiments of this application may be an audio signal decoder in the terminal device or the network device in FIG. 14 to FIG. 16.

As shown in FIG. 14, during audio communication, an audio signal encoder in a first terminal device encodes a collected audio signal, and a channel encoder in the first terminal device may perform channel encoding on a bitstream obtained by the audio signal encoder. Then, data obtained by the first terminal device through channel encoding is transmitted to a second terminal device by using a first network device and a second network device. After the second terminal device receives the data from the second network device, a channel decoder of the second terminal device performs channel decoding to obtain an encoded bitstream of an audio signal, an audio signal decoder of the second terminal device performs decoding to restore the audio signal, and a terminal device plays back the audio signal. In this way, audio communication is completed between different terminal devices.

It should be understood that, in FIG. 14, the second terminal device may alternatively encode the collected audio signal, and finally transmit, to the first terminal device by using the second network device and the first network device, data finally obtained through encoding. The first terminal device performs channel decoding and decoding on the data to obtain the audio signal.

In FIG. 14, the first network device and the second network device may be wireless network communication devices or wired network communication devices. The first network device and the second network device may communicate with each other through a digital channel.

The first terminal device or the second terminal device in FIG. 14 may perform the audio signal encoding/decoding method in embodiments of this application. The encoding apparatus and the decoding apparatus in embodiments of this application may be respectively the audio signal encoder and the audio signal decoder in the first terminal device or the second terminal device.

During audio communication, a network device may implement transcoding of an encoding/decoding format of an audio signal. As shown in FIG. 15, if an encoding/decoding format of a signal received by the network device is an encoding/decoding format corresponding to another audio signal decoder, a channel decoder in the network device performs channel decoding on the received signal to obtain an encoded bitstream corresponding to the another audio signal decoder, the another audio signal decoder decodes the encoded bitstream to obtain the audio signal, an audio signal encoder encodes the audio signal to obtain an encoded bitstream of the audio signal, and a channel encoder finally performs channel encoding on the encoded bitstream of the audio signal to obtain a final signal (the signal may be transmitted to a terminal device or another network device). It should be understood that an encoding/decoding format corresponding to the audio signal encoder in FIG. 15 is different from an encoding/decoding format corresponding to the another audio signal decoder. It is assumed that the encoding/decoding format corresponding to the another audio signal decoder is a first encoding/decoding format, and the encoding/decoding format corresponding to the audio signal encoder is a second encoding/decoding format. In this case, in FIG. 15, the network device converts the audio signal from the first encoding/decoding format to the second encoding/decoding format.

Similarly, as shown in FIG. 16, if an encoding/decoding format of a signal received by a network device is the same as an encoding/decoding format corresponding to an audio signal decoder, after a channel decoder in the network device performs channel decoding to obtain an encoded bitstream of an audio signal, the audio signal decoder may decode the encoded bitstream of the audio signal to obtain the audio signal. Another audio signal encoder then encodes the audio signal based on another encoding/decoding format to obtain an encoded bitstream corresponding to the another audio signal encoder. A channel encoder finally performs channel encoding on an encoded bitstream corresponding to the another audio signal encoder, to obtain a final signal (the signal may be transmitted to a terminal device or another network device). Same as the case in FIG. 15, in FIG. 16, an encoding/decoding format corresponding to the audio signal decoder is also different from an encoding/decoding format corresponding to the another audio signal encoder. If the encoding/decoding format corresponding to the another audio signal encoder is a first encoding/decoding format, and the encoding/decoding format corresponding to the audio signal decoder is a second encoding/decoding format, in FIG. 16, the network device converts the audio signal from the second encoding/decoding format to the first encoding/decoding format.

In FIG. 15 and FIG. 16, the another audio encoder/decoder and the audio encoder/decoder correspond to different encoding/decoding formats. Therefore, transcoding of the audio signal encoding/decoding format is implemented through processing by the another audio encoder/decoder and the audio encoder/decoder.

It should be further understood that the audio signal encoder in FIG. 15 can implement the audio signal encoding method in embodiments of this application, and the audio signal decoder in FIG. 16 can implement the audio signal decoding method in embodiments of this application. The encoding apparatus in embodiments of this application may be the audio signal encoder in the network device in FIG. 15, and the decoding apparatus in embodiments of this application may be the audio signal decoder in the network device in FIG. 15. In addition, the network device in FIG. 15 and FIG. 16 may be specifically a wireless network communication device or a wired network communication device.

Figure 17:
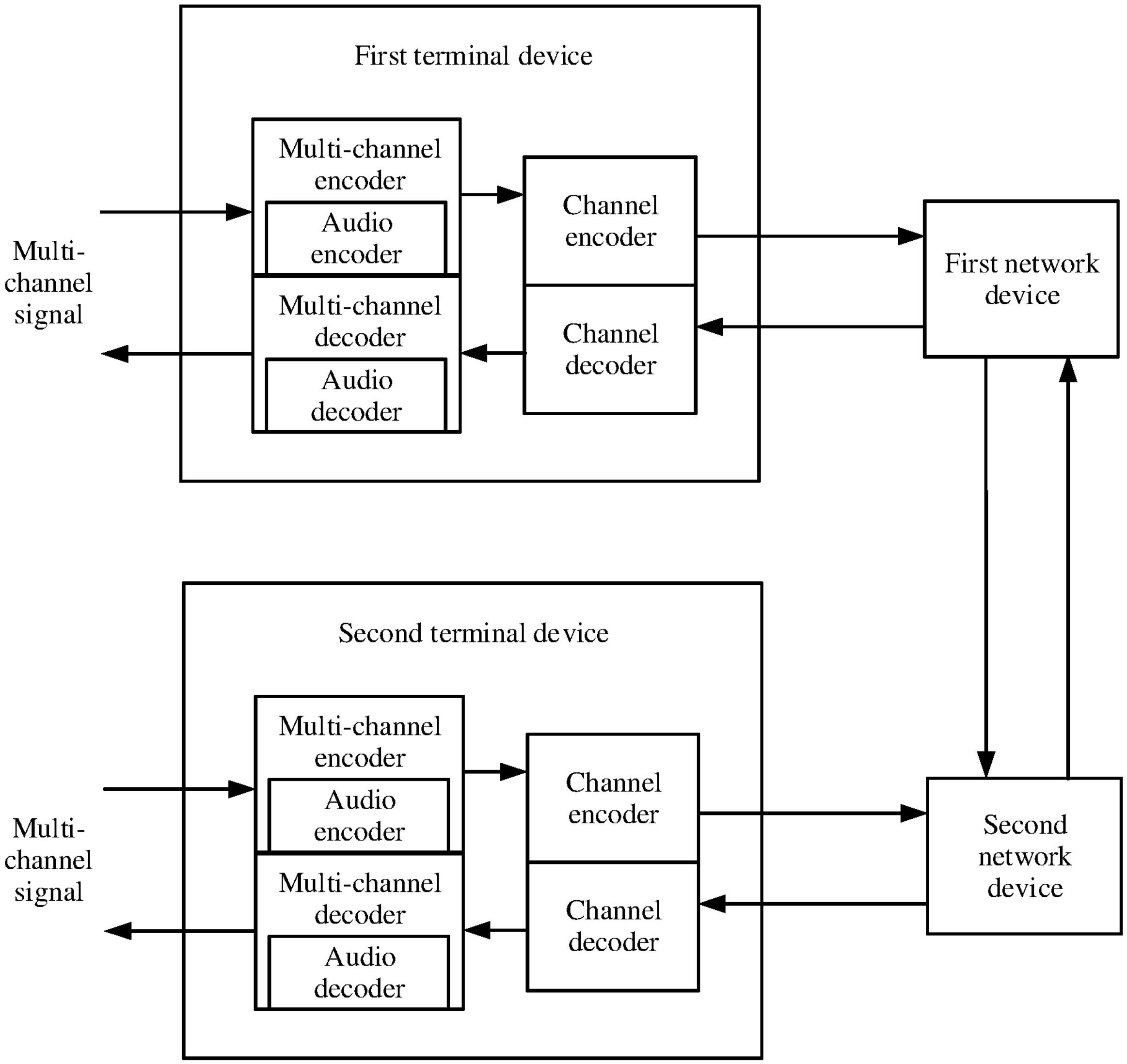
FIG. 17 is a schematic diagram of a terminal device according to an embodiment of this application.
Figure 18:
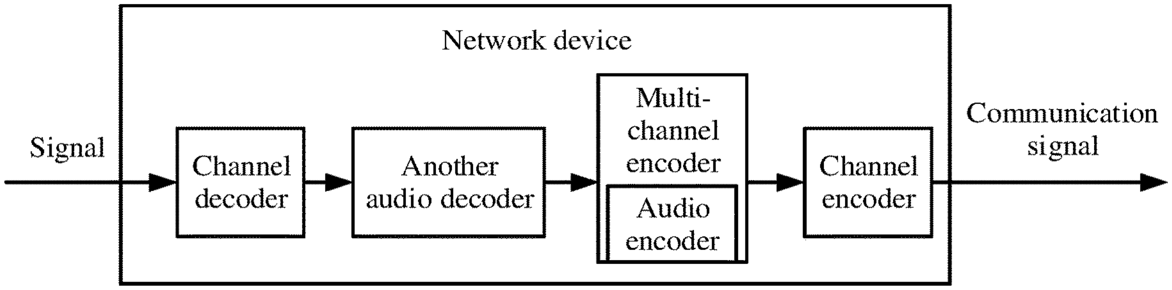
FIG. 18 is a schematic diagram of a network device according to an embodiment of this application.
Figure 19:
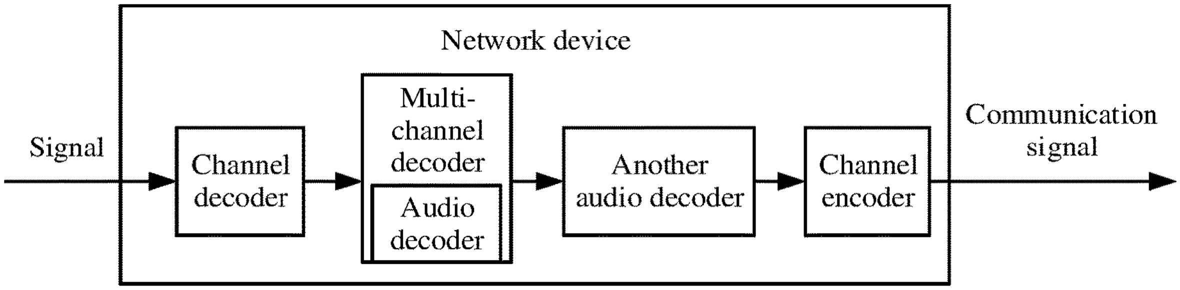
FIG. 19 is a schematic diagram of a network device according to an embodiment of this application.

It should be understood that the audio signal encoding method and the audio signal decoding method in embodiments of this application may also be performed by a terminal device or a network device in FIG. 17 to FIG. 19. In addition, the encoding apparatus and the decoding apparatus in embodiments of this application may be further disposed in the terminal device or the network device in FIG. 17 to FIG. 19. Specifically, the encoding apparatus in embodiments of this application may be an audio signal encoder in a multi-channel encoder in the terminal device or the network device in FIG. 17 to FIG. 19, and the decoding apparatus in embodiments of this application may be an audio signal decoder in the multi-channel encoder in the terminal device or the network device in FIG. 17 to FIG. 19.

As shown in FIG. 17, during audio communication, an audio signal encoder in a multi-channel encoder in a first terminal device performs audio encoding on an audio signal generated from a collected multi-channel signal. A bitstream obtained by the multi-channel encoder includes a bitstream obtained by the audio signal encoder. A channel encoder in the first terminal device may further perform channel encoding on the bitstream obtained by the multi-channel encoder. Then, data obtained by the first terminal device through channel encoding is transmitted to a second terminal device by using a first network device and a second network device. After the second terminal device receives the data from the second network device, a channel decoder in the second terminal device performs channel decoding, to obtain an encoded bitstream of the multi-channel signal. The encoded bitstream of the multi-channel signal includes an encoded bitstream of an audio signal. An audio signal decoder in the multi-channel decoder in the second terminal device performs decoding to restore the audio signal. The multi-channel decoder decodes the restored audio signal to obtain the multi-channel signal. The second terminal device plays back the multi-channel signal. In this way, audio communication is completed between different terminal devices.

It should be understood that, in FIG. 17, the second terminal device may alternatively encode the collected multi-channel signal (specifically, an audio signal encoder in a multi-channel encoder in the second terminal device performs audio encoding on the audio signal generated from the collected multi-channel signal, a channel encoder in the second terminal device then performs channel encoding on a bitstream obtained by the multi-channel encoder), and an encoded bitstream is finally transmitted to the first terminal device by using the second network device and the first network device. The first terminal device obtains the multi-channel signal through channel decoding and multi-channel decoding.

In FIG. 17, the first network device and the second network device may be wireless network communication devices or wired network communication devices. The first network device and the second network device may communicate with each other through a digital channel.

The first terminal device or the second terminal device in FIG. 17 may perform the audio signal encoding/decoding method in embodiments of this application. In addition, the encoding apparatus in embodiments of this application may be the audio signal encoder in the first terminal device or the second terminal device, and the decoding apparatus in embodiments of this application may be an audio signal decoder in the first terminal device or the second terminal device.

During audio communication, a network device may implement transcoding of an encoding/decoding format of an audio signal. As shown in FIG. 18, if an encoding/ decoding format of a signal received by the network device is an encoding/decoding format corresponding to another multi-channel decoder, a channel decoder in the network device performs channel decoding on the received signal, to obtain an encoded bitstream corresponding to the another multi-channel decoder. The another multi-channel decoder decodes the encoded bitstream to obtain a multi-channel signal. A multi-channel encoder encodes the multi-channel signal to obtain an encoded bitstream of the multi-channel signal. An audio signal encoder in the multi-channel encoder performs audio encoding on an audio signal generated from the multi-channel signal, to obtain an encoded bitstream of the audio signal. The encoded bitstream of the multi-channel signal includes the encoded bitstream of the audio signal. A channel encoder finally performs channel encoding on the encoded bitstream, to obtain a final signal (the signal may be transmitted to a terminal device or another network device).

Similarly, as shown in FIG. 19, if an encoding/decoding format of a signal received by a network device is the same as an encoding/decoding format corresponding to a multi-channel decoder, after a channel decoder in the network device performs channel decoding to obtain an encoded bitstream of a multi-channel signal, the multi-channel decoder may decode the encoded bitstream of the multi-channel signal to obtain the multi-channel signal. An audio signal decoder in the multi-channel decoder performs audio decoding on an encoded bitstream of an audio signal in the encoded bitstream of the multi-channel signal. Another multi-channel encoder then encodes the multi-channel signal based on another encoding/decoding format to obtain an encoded bitstream of the multi-channel signal corresponding to the another multi-channel encoder. A channel encoder finally performs channel encoding on the encoded bitstream corresponding to the another multi-channel encoder, to obtain a final signal (the signal may be transmitted to a terminal device or another network device).

It should be understood that, in FIG. 18 and FIG. 19, the another multi-channel encoder/decoder and the multi-channel encoder/decoder correspond to different encoding/decoding formats. For example, in FIG. 18, an encoding/decoding format corresponding to another audio signal decoder is a first encoding/decoding format, and the encoding/decoding format corresponding to the multi-channel encoder is a second encoding/decoding format. In this case, in FIG. 18, the network device converts the audio signal from the first encoding/decoding format to the second encoding/decoding format. Similarly, in FIG. 19, it is assumed that the encoding/decoding format corresponding to the multi-channel decoder is a second encoding/decoding format, and the encoding/decoding format corresponding to the another audio signal decoder is a first encoding/decoding format. In this case, in FIG. 19, the network device converts the audio signal from the second encoding/decoding format to the first encoding/decoding format. Therefore, transcoding of the encoding/decoding format of the audio signal is implemented through processing by the another multi-channel encoder/decoder and the multi-channel encoder/decoder.

It should be further understood that the audio signal encoder in FIG. 18 can implement the audio signal encoding method in this application, and the audio signal decoder in FIG. 19 can implement the audio signal decoding method in this application. The encoding apparatus in embodiments of this application may be the audio signal encoder in the network device in FIG. 19, and the decoding apparatus in embodiments of this application may be the audio signal decoder in the network device in FIG. 19. In addition, the network device in FIG. 18 and FIG. 19 may be specifically a wireless network communication device or a wired network communication device.

A person of ordinary skill in the art may be aware that, in combination with the examples described in embodiments disclosed in this specification, units and algorithm steps may be implemented by using electronic hardware or a combination of computer software and electronic hardware. Whether the functions are performed by hardware or software depends on particular applications and design constraints of the technical solutions. A person skilled in the art may use different methods to implement the described functions of each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate components may or may not be physically separate, and components displayed as units may or may not be physical units. To be specific, the components may be located at one position, or may be distributed on a plurality of network units. A part or all of the units may be selected based on actual requirements to achieve the objectives of the solutions in embodiments.

In addition, functional units in embodiments of this application may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or a part of the technical solutions may be implemented in a form of a software product. The computer software product is stored in a storage medium, and includes several instructions for instructing a computer device (which may be a personal computer, a server, a network device, or the like) to perform all or a part of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An audio signal decoding method, comprising:

parsing a bitstream to obtain a decoded frequency-domain coefficient of a current frame, a filtering parameter, and a long-term prediction (LTP) identifier of the current frame, wherein the LTP identifier indicates whether to perform LTP processing on the current frame; and processing the decoded frequency-domain coefficient of the current frame based on the filtering parameter and the LTP identifier of the current frame to obtain a frequency-domain coefficient of the current frame;

wherein when a value of the LTP identifier of the current frame is a first value, the decoded frequency-domain coefficient of the current frame is a residual frequency-domain coefficient of the current frame, and the processing the decoded frequency-domain coefficient of the current frame based on the filtering parameter and the LTP identifier of the current frame to obtain a frequency-domain coefficient of the current frame comprises:

obtaining a reference target frequency-domain coefficient of the current frame, performing LTP synthesis on the reference target frequency-domain coefficient and the residual frequency-domain coefficient of the current frame to obtain a target frequency-domain coefficient of the current frame, and performing inverse filtering processing on the target frequency-domain coefficient of the current frame to obtain the frequency-domain coefficient of the current frame; and wherein when the value of the LTP identifier of the current frame is a second value, the decoded frequency-domain coefficient of the current frame is a target frequency-domain coefficient of the current frame, and the processing the decoded frequency-domain coefficient of the current frame based on the filtering parameter and the LTP identifier of the current frame to obtain a frequency-domain coefficient of the current frame comprises:

performing inverse filtering processing on the target frequency-domain coefficient of the current frame to obtain the frequency-domain coefficient of the current frame, wherein the current frame comprises a first channel and a second channel, wherein the performing LTP synthesis on the reference target frequency-domain coefficient and the residual frequency domain coefficient of the current frame to obtain a target frequency-domain coefficient of the current frame comprises:

parsing the bitstream to obtain a stereo coding identifier of the current frame, wherein the stereo coding identifier indicates whether to perform stereo coding on the current frame;

performing LTP synthesis on the residual frequency-domain coefficient of the current frame and the reference target frequency-domain coefficient based on the stereo coding identifier to obtain an LTP-synthesized target frequency-domain coefficient of the current frame; and performing stereo decoding on the LTP-synthesized target frequency-domain coefficient of the current frame based on the stereo coding identifier to obtain the target frequency-domain coefficient of the current frame, and wherein the performing LTP synthesis on the residual frequency-domain coefficient of the current frame and the reference target frequency-domain coefficient based on the stereo coding identifier to obtain an LTP-synthesized target frequency-domain coefficient of the current frame comprises:

when a value of the stereo coding identifier is a first value, performing stereo decoding on the reference target frequency-domain coefficient to obtain a decoded reference target frequency-domain coefficient, wherein the first value indicates to perform stereo coding on the current frame, and performing LTP synthesis on a residual frequency-domain coefficient of the first channel, a residual frequency-domain coefficient of the second channel, and the decoded reference target frequency-domain coefficient to obtain an LTP-synthesized target frequency-domain coefficient of the first channel and an LTP-synthesized target frequency-domain coefficient of the second channel; and when a value of the stereo coding identifier is a second value, performing LTP processing on a residual frequency-domain coefficient of the first channel, a residual frequency-domain coefficient of the second channel, and the reference target frequency-domain efficient to obtain an LTP-synthesized target frequency-domain coefficient of the first channel and an LTP-synthesized target frequency-domain coefficient of the second channel, wherein the second value indicates not to perform stereo coding on the current frame.

2. The audio signal decoding method according to claim 1, wherein the filtering parameter is used to perform filtering processing on the frequency-domain coefficient of the current frame, and the filtering processing comprises temporary noise shaping processing and/or frequency-domain noise shaping processing.

3. The audio signal decoding method according to claim 1, wherein the LTP identifier of the current frame indicates whether to perform LTP processing on both the first channel and the second channel of the current frame; or the LTP identifier of the current frame comprises an LTP identifier of the first channel and an LTP identifier of the second channel, wherein the LTP identifier of the first channel indicates whether to perform LTP processing on the first channel, and the LTP identifier of the second channel indicates whether to perform LTP processing on the second channel.

4. The audio signal decoding method according to claim 1, wherein the obtaining a reference target frequency-domain coefficient of the current frame comprises:

parsing the bitstream to obtain a pitch period of the current frame;

determining a reference frequency-domain coefficient of the current frame based on the pitch period of the current frame; and performing filtering processing on the reference frequency-domain coefficient based on the filtering parameter to obtain a reference target frequency-domain coefficient.

5. The audio signal decoding method according to claim 1, wherein the inverse filtering processing comprises inverse temporary noise shaping processing and/or inverse frequency-domain noise shaping processing.

6. The audio signal decoding method according to claim 3, wherein the performing LTP synthesis on the reference target frequency-domain coefficient and the residual frequency-domain coefficient of the current frame to obtain a target frequency-domain coefficient of the current frame comprises:

parsing the bitstream to obtain a stereo coding identifier of the current frame, wherein the stereo coding identifier indicates whether to perform stereo coding on the current frame;

performing stereo decoding on the residual frequency-domain coefficient of the current frame based on the stereo coding identifier to obtain a decoded residual frequency-domain coefficient of the current frame; and performing LTP synthesis on the decoded residual frequency-domain coefficient of the current frame based on the value of the LTP identifier of the current frame and the stereo coding identifier to obtain the target frequency-domain coefficient of the current frame.

7. An audio signal decoding method, comprising:

parsing a bitstream to obtain a decoded frequency-domain coefficient of a current frame, a filtering parameter, and a long-term prediction (LTP) identifier of the current frame, wherein the LTP identifier indicates whether to perform LTP processing on the current frame; and processing the decoded frequency-domain coefficient of the current frame based on the filtering parameter and the LTP identifier of the current frame to obtain a frequency-domain coefficient of the current frame;

wherein when a value of the LTP identifier of the current frame is a first value, the decoded frequency-domain coefficient of the current frame is a residual frequency-domain coefficient of the current frame, and the processing the decoded frequency-domain coefficient of the current frame based on the filtering parameter and the LTP identifier of the current frame to obtain a frequency-domain coefficient of the current frame comprises:

obtaining a reference target frequency-domain coefficient of the current frame, performing LTP synthesis on the reference target frequency-domain coefficient and the residual frequency-domain coefficient of the current frame to obtain a target frequency-domain coefficient of the current frame, and performing inverse filtering processing on the target frequency-domain coefficient of the current frame to obtain the frequency-domain coefficient of the current frame; and wherein when the value of the LTP identifier of the current frame is a second value, the decoded frequency-domain coefficient of the current frame is a target frequency-domain coefficient of the current frame, and the processing the decoded frequency-domain coefficient of the current frame based on the filtering parameter and the LTP identifier of the current frame to obtain a frequency-domain coefficient of the current frame comprises:

performing inverse filtering processing on the target frequency-domain coefficient of the current frame to obtain the frequency-domain coefficient of the current frame, wherein the current frame comprises a first channel and a second channel, and the LTP identifier of the current frame indicates whether to perform LTP processing on both the first channel and the second channel of the current frame; or the LTP identifier of the current frame comprises an LTP identifier of a first channel and an LTP identifier of a second channel, wherein the LTP identifier of the first channel indicates whether to perform LTP processing on the first channel, and the LTP identifier of the second channel indicates whether to perform LTP processing on the second channel, wherein the performing LTP synthesis on the reference target frequency-domain coefficient and the residual frequency domain coefficient of the current frame to obtain a target frequency-domain coefficient of the current frame comprises:

parsing the bitstream to obtain a stereo coding identifier of the current frame, wherein the stereo coding identifier indicates whether to perform stereo coding on the current frame;

performing stero devoding on the residual frquency-domain coeffiecient of the current frame based on the stereo coding identifier to obtain a decoded residual frequency-domain coefficient of the current frame; and performing LTP synthesis on the decoded residual frequency domain coefficient of the current frame based on the value of the LTP identifier of the current frame and the stereo coding identifier to obtain the target frequency-domain coefficient of the current frame, and wherein the performing LTP synthesis on the decoded residual frequency-domain coefficient of the current frame based on the value of the LTP identifier of the current frame and the stereo coding identifier to obtain the target frequency-domain coefficient of the current frame comprises:

when a value of the stereo coding identifier is a first value, performing stereo decoding on the reference target frequency-domain coefficient to obtain a decoded reference target frequency-domain coefficient, wherein the first value indicates to perform stereo coding on the current frame, and performing LTP synthesis on a decoded residual frequency-domain coefficient of the first channel, a decoded residual frequency-domain coefficient of the second channel, and the decoded reference target frequency-domain coefficient to obtain a target frequency-domain coefficient of the first channel and a target frequency-domain coefficient of the second channel; and when a value of the stereo coding identifier is a second value, performing LTP synthesis on a decoded residual frequency-domain coefficient of the first channel, a decoded residual frequency-domain coefficient of the second channel, and the reference target frequency-domain coefficient to obtain a target frequency-domain coefficient of the first channel and a target frequency-domain coefficient of the second channel, wherein the second value indicates not to perform stereo coding on the current frame.

8. An audio signal decoding apparatus, comprising:

at least one processor; and one or more memories coupled to the at least one processor and storing programming instructions that, when executed by the at least one processor, cause the audio signal decoding apparatus to:

parse a bitstream to obtain a decoded frequency-domain coefficient of a current frame, a filtering parameter, and a long-term prediction (LTP) identifier of the current frame, wherein the LTP identifier indicates whether to perform LTP processing on the current frame; and process the decoded frequency-domain coefficient of the current frame based on the filtering parameter and the LTP identifier of the current frame to obtain a frequency-domain coefficient of the current frame;

wherein when a value of the LTP identifier of the current frame is a first value, the decoded frequency-domain coefficient of the current frame is a residual frequency-domain coefficient of the current frame, and the processing the decoded frequency-domain coefficient of the current frame based on the filtering parameter and the LTP identifier of the current frame to obtain a frequency-domain coefficient of the current frame comprises:

obtaining a reference target frequency-domain coefficient of the current frame, performing LTP synthesis on the reference target frequency-domain coefficient and the residual frequency-domain coefficient of the current frame to obtain a target frequency-domain coefficient of the current frame, and performing inverse filtering processing on the target frequency-domain coefficient of the current frame to obtain the frequency-domain coefficient of the current frame; and wherein when the value of the LTP identifier of the current frame is a second value, the decoded frequency-domain coefficient of the current frame is a target frequency-domain coefficient of the current frame, and the processing the decoded frequency-domain coefficient of the current frame based on the filtering parameter and the LTP identifier of the current frame to obtain a frequency-domain coefficient of the current frame comprises:

performing inverse filtering processing on the target frequency-domain coefficient of the current frame to obtain the frequency-domain coefficient of the current frame, wherein the current frame comprises a first channel and a second channel, wherein the performing LTP synthesis on the reference target frequency-domain coefficient and the residual frequency domain coefficient of the current frame to obtain a target frequency-domain coefficient of the current frame comprises:

parsing the bitstream to obtain a stereo coding identifier of the current frame, wherein the stereo coding identifier indicates whether to perform stereo coding on the current frame;

performing LTP synthesis on the residual frequency-domain coefficient of the current frame and the reference target frequency-domain coefficient based on the stereo coding identifier to obtain an LTP-synthesized target frequency-domain coefficient of the current frame; and performing stereo decoding on the LTP-synthesized target frequency-domain coefficient of the current frame based on the stereo coding identifier to obtain the target frequency-domain coefficient of the current frame, and wherein the performing LTP synthesis on the residual frequency-domain coefficient of the current frame and the reference target frequency-domain coefficient based on the stereo coding identifier to obtain an LTP-synthesized target frequency-domain coefficient of the current frame comprises:

when a value of the stereo coding identifier is a first value, performing stereo decoding on the reference target frequency-domain coefficient to obtain a decoded reference target frequency-domain coefficient, wherein the first value indicates to perform stereo coding on the current frame, and performing LTP synthesis on a residual frequency-domain coefficient of the first channel, a residual frequency-domain coefficient of the second channel, and the decoded reference target frequency-domain coefficient to obtain an LTP-synthesized target frequency-domain coefficient of the first channel and an LTP-synthesized target frequency-domain coefficient of the second channel; and when a value of the stereo coding identifier is a second value, performing LTP processing on a residual frequency-domain coefficient of the first channel, a residual frequency-domain coefficient of the second channel, and the reference target frequency-domain efficient to obtain an LTP-synthesized target frequency-domain coefficient of the first channel and an LTP-synthesized target frequency-domain coefficient of the second channel, wherein the second value indicates not to perform stereo coding on the current frame.

9. The audio signal decoding apparatus according to claim 8, wherein the filtering parameter is used to perform filtering processing on the frequency-domain coefficient of the current frame, and the filtering processing comprises temporary noise shaping processing and/or frequency-domain noise shaping processing.

10. The audio signal decoding apparatus according to claim 8, wherein the LTP identifier of the current frame indicates whether to perform LTP processing on both the first channel and the second channel of the current frame; or the LTP identifier of the current frame comprises an LTP identifier of the first channel and an LTP identifier of the second channel, wherein the LTP identifier of the first channel indicates whether to perform LTP processing on the first channel, and the LTP identifier of the second channel indicates whether to perform LTP processing on the second channel.

11. The audio signal decoding apparatus according to claim 8, wherein the programming instructions, when executed by the at least one processor, further cause the audio signal decoding apparatus to:

parse the bitstream to obtain a pitch period of the current frame;

determine a reference frequency-domain coefficient of the current frame based on the pitch period of the current frame; and perform filtering processing on the reference frequency-domain coefficient based on the filtering parameter to obtain a reference target frequency-domain coefficient.

* * * * *